United States Patent
Nishikawa

(10) Patent No.: US 10,468,646 B2
(45) Date of Patent: Nov. 5, 2019

(54) ENERGY STORAGE APPARATUS AND MANUFACTURING METHOD OF ENERGY STORAGE APPARATUS

(71) Applicant: GS Yuasa International Ltd., Kyoto-shi (JP)

(72) Inventor: Ryutaro Nishikawa, Kyoto (JP)

(73) Assignee: GS YUASA INTERNATIONAL LTD., Kyoto-Shi, Kyoto (JP)

( * ) Notice: Subject to any disclaimer, the term of this patent is extended or adjusted under 35 U.S.C. 154(b) by 93 days.

(21) Appl. No.: 15/277,816

(22) Filed: Sep. 27, 2016

(65) Prior Publication Data

US 2017/0092911 A1    Mar. 30, 2017

(30) Foreign Application Priority Data

Sep. 29, 2015   (JP) .................. 2015-192335

(51) Int. Cl.

| | |
|---|---|
| *H01M 2/00* | (2006.01) |
| *H01M 2/10* | (2006.01) |
| *H01G 9/08* | (2006.01) |
| *H01G 11/82* | (2013.01) |
| *H01M 2/20* | (2006.01) |
| *H01M 10/04* | (2006.01) |

(Continued)

(52) U.S. Cl.
CPC ............ *H01M 2/1094* (2013.01); *H01G 9/08* (2013.01); *H01G 11/78* (2013.01); *H01G 11/82* (2013.01); *H01M 2/1077* (2013.01); *H01M 2/206* (2013.01); *H01M 10/0413* (2013.01); *H01M 10/0525* (2013.01); *H01G 9/0029* (2013.01); *Y02E 60/13* (2013.01)

(58) Field of Classification Search
CPC ......... H01M 10/0525; H01M 10/0413; H01M 2/206; H01M 12/1094; H01M 2/1077; H01G 9/0029; H01G 11/82
See application file for complete search history.

(56) References Cited

U.S. PATENT DOCUMENTS 5,765,751 A * 6/1998 Joshi ............... A01M 1/2044
239/56
6,765,751 B2 * 7/2004 Huang ................. G11B 5/54
360/133

(Continued)

FOREIGN PATENT DOCUMENTS

| | | | |
|---|---|---|---|
| JP | H08-264169 A | 10/1996 | |
| JP | H11-126585 A | 5/1999 | |

(Continued)

OTHER PUBLICATIONS

Japanese Office Action dated Jun. 30, 2019, in Japanese Patent Application No. 2015-192335 with an English translation.

*Primary Examiner* — Cynthia H Kelly
*Assistant Examiner* — Monique M Wills
(74) *Attorney, Agent, or Firm* — McGinn IP Law Group, PLLC

(57) ABSTRACT

An energy storage apparatus includes an energy storage device and an outer case. The outer case includes a side wall portion disposed in an opposedly facing manner with a side surface of the energy storage device and a high rigidity member having higher rigidity than the side wall portion, the high rigidity member being disposed between the side wall portion and the energy storage device and mounted on the side wall portion.

19 Claims, 16 Drawing Sheets

(51) Int. Cl.
   *H01M 10/0525*  (2010.01)
   *H01G 11/78*   (2013.01)
   *H01G 9/00*    (2006.01)

(56)          References Cited

U.S. PATENT DOCUMENTS

| | | | |
|---|---|---|---|
| 2006/0093899 A1 | 5/2006 | Jeon et al. | |
| 2008/0254360 A1* | 10/2008 | Miyazawa | H01M 2/021 429/184 |
| 2009/0256525 A1* | 10/2009 | Kitanaka | B60L 3/0046 320/134 |
| 2009/0269657 A1* | 10/2009 | Mita | H01M 2/1077 429/151 |
| 2012/0148890 A1 | 6/2012 | Goto et al. | |
| 2012/0257349 A1 | 10/2012 | Bang et al. | |
| 2013/0146323 A1* | 6/2013 | Yamaguchi | H05K 5/061 174/50 |
| 2013/0183543 A1 | 7/2013 | Yoshioka et al. | |
| 2013/0183573 A1 | 7/2013 | Yoshioka et al. | |
| 2014/0011056 A1 | 1/2014 | Adachi | |
| 2014/0023906 A1* | 1/2014 | Hashimoto | H01M 2/1077 429/120 |

FOREIGN PATENT DOCUMENTS

| | | |
|---|---|---|
| JP | 2010-080450 A | 4/2010 |
| JP | 2011-071097 A | 4/2011 |
| JP | 2011-198511 A | 10/2011 |
| JP | 2012-243689 A | 12/2012 |
| JP | 2013-514626 A | 4/2013 |
| JP | 2013-168356 A | 8/2013 |
| JP | 2013-168357 A | 8/2013 |
| JP | 2014-013726 A | 1/2014 |
| JP | 2014-102939 A | 6/2014 |
| JP | 2014-197516 A | 10/2014 |
| JP | 2014-216195 A | 11/2014 |
| JP | 2014-220089 A | 11/2014 |
| JP | 2015-122335 A | 7/2015 |
| JP | 2016-009585 A | 1/2016 |
| JP | 2016-091871 A | 5/2016 |
| WO | WO 2014/065110 A1 | 5/2014 |

\* cited by examiner

US 10,468,646 B2

ENERGY STORAGE APPARATUS AND MANUFACTURING METHOD OF ENERGY STORAGE APPARATUS

CROSS-REFERENCE TO RELATED APPLICATIONS

This application claims the benefit of Japanese patent application No. 2015-192335, filed on Sep. 29, 2015, which is incorporated by reference.

FIELD

The present invention relates to an energy storage apparatus which includes energy storage devices and an outer case, and a method of manufacturing the energy storage apparatus.

BACKGROUND

Conventionally, there has been known an energy storage apparatus where a plurality of energy storage devices are housed in the inside of an outer case (see JP 2010-80450 A, for example). In such an energy storage apparatus, a plurality of energy storage devices (unit batteries) are housed in the inside of the outer case (case) having partitions therein. When an external force is applied to the energy storage apparatus, the irregular deformation of the entire outer case is prevented by the partitions thus enhancing safety of the energy storage devices.

However, in the above-mentioned conventional energy storage apparatus, depending on an external force applied to the energy storage apparatus, there exists a problem that the energy storage devices may not be properly protected. That is, in the above-mentioned conventional energy storage apparatus, although the irregular deformation of the entire outer case can be prevented by the partitions, when an external force is applied to a certain surface of the outer case in a concentrated manner or the like, there is a possibility that such a surface is damaged including deformation. In this case, there is a possibility that the energy storage device which is arranged in an opposedly facing manner with such a surface is damaged.

SUMMARY

The following presents a simplified summary of the invention disclosed herein in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

An object of the present invention to provide an energy storage apparatus which can properly protect energy storage devices from an external force and a method of manufacturing the energy storage apparatus.

According to an aspect of the present invention, there is provided an energy storage apparatus including: an energy storage device; and an outer case, wherein the outer case includes: a first wall portion disposed in an opposedly facing manner with a side surface of the energy storage device; and a first member having higher rigidity than the first wall portion, the first member being disposed between the first wall portion and the energy storage device and mounted on the first wall portion.

BRIEF DESCRIPTION OF DRAWINGS

The foregoing and other features of the present invention will become apparent from the following description and drawings of an illustrative embodiment of the invention in which.

DESCRIPTION OF EMBODIMENTS

Figure 1:
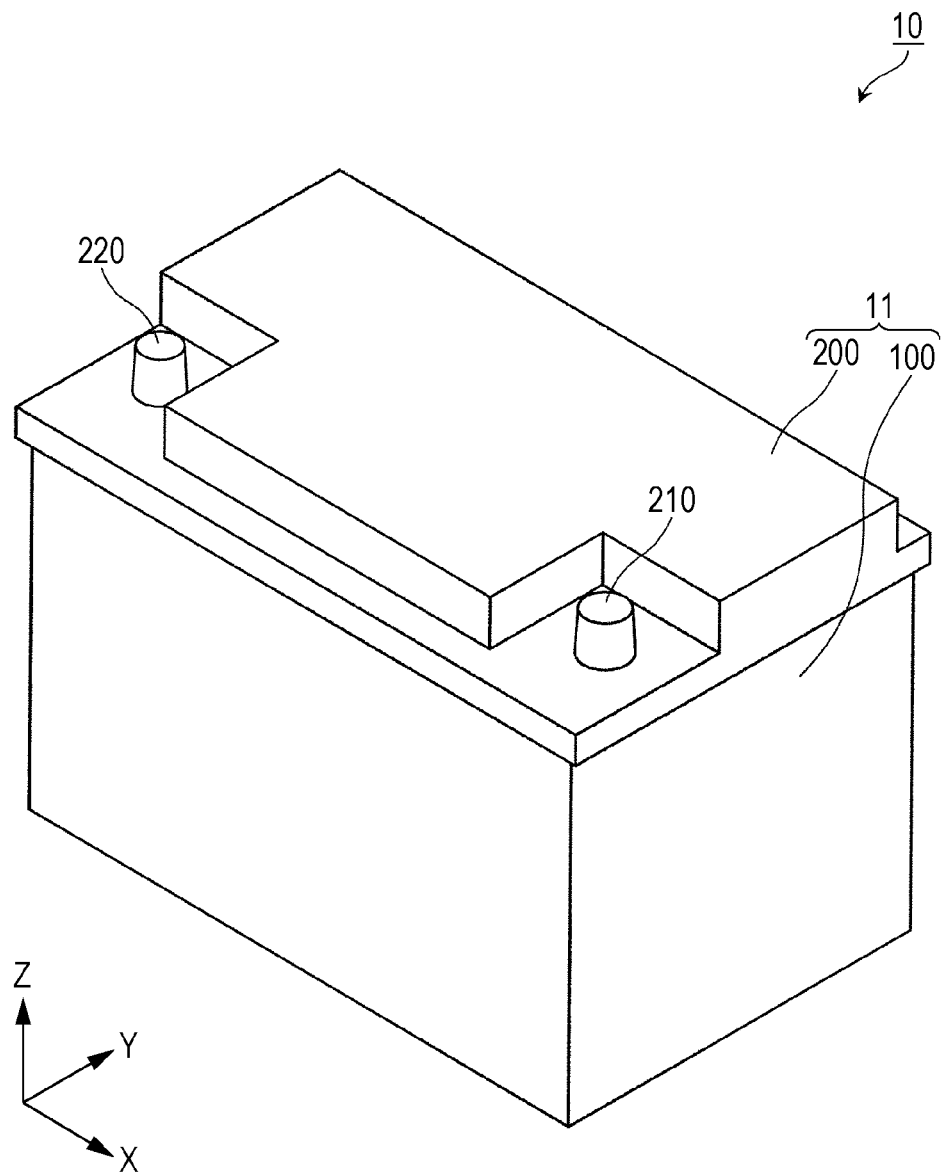
FIG. 1 is a perspective view showing an external appearance of an energy storage apparatus according to an embodiment of the present invention.

According to an aspect of the present invention, there is provided an energy storage apparatus including: an energy storage device; and an outer case, wherein the outer case includes: a first wall portion disposed in an opposedly facing manner with a side surface of the energy storage device; and a first member having higher rigidity than the first wall portion, the first member being disposed between the first wall portion and the energy storage device and mounted on the first wall portion.

With such a configuration, in the energy storage apparatus, the outer case includes the first member which has higher rigidity than the first wall portion, is disposed between the first wall portion and the energy storage device and is mounted on the first wall portion. Accordingly, rigidity of the first wall portion of the outer case can be increased by the first member and hence, it is possible to protect the energy storage device from an external force from a first wall portion side of the outer case.

The first member may have insulating property.

With such a configuration, since the first wall portion has insulating property and hence, it is possible to ensure insulation between the energy storage apparatus and external equipment. Further, even when there is a possibility that the first wall portion is brought into contact with a human hand at the time of exchanging the energy storage apparatus or the like, since the first wall portion has insulating property and hence, safety can be enhanced.

According to another aspect of the present invention, there is provided an energy storage apparatus including: an energy storage device; and an outer case, wherein the outer case includes: a resin-made first wall portion disposed in an opposedly facing manner with a side surface of the energy storage device; and a metal first member disposed between the first wall portion and the energy storage device and mounted on the first wall portion.

With such a configuration, in the energy storage apparatus, the outer case has the metal-made first member disposed between the resin-made first wall portion and the energy storage device and mounted on the first wall portion. Accordingly, rigidity of the resin-made first wall portion can be increased by the metal-made first member and hence, it is possible to protect the energy storage device from an external force from the first wall portion side of the outer case.

The outer case may include a fixing portion for fixing the first wall portion and the first member to each other, and the fixing portion may be positioned on an end portion of the first wall portion.

With such a configuration, the outer case has the fixing portion for fixing the first wall portion and the first member to each other on the end portion of the first wall portion and hence, the first member can be firmly fixed to the first wall portion.

The fixing portion may be formed of two columnar portions formed on both ends of the first wall portion, and the first member may be disposed between the two columnar portions and be fixed to the two columnar portions.

With such a configuration, the first member is fixed by being sandwiched between the two columnar portions formed on both ends of the first wall portion and hence, the first member can be fixed to the first wall portion more firmly.

The outer case may further include: a second wall portion disposed at a position adjacently to the first wall portion; and a second member having higher rigidity than the second wall portion, the second member being disposed between the second wall portion and the energy storage device and mounted on the second wall portion.

With such a configuration, the outer case has the second member between the second wall portion disposed adjacently to the first wall portion and the energy storage device. The second member has the higher rigidity than the second wall portion and is mounted on the second wall portion. Accordingly, rigidity of the two wall portions disposed adjacently to the outer case can be further increased by the second member and hence, it is possible to protect the energy storage device from an external force from two wall portion sides disposed adjacently to each other.

The first member and the second member may be fixed to each other.

With such a configuration, by fixing the first member and the second member to each other, the relative movement between the first member and the second member in the inside of the outer case can be restricted.

The first wall portion may be a wall portion disposed on a long-side surface of the outer case, and the outer case may further include: a second wall portion disposed on a short-side surface of the outer case, and a space forming wall portion disposed between the second wall portion and the energy storage device and forming a plurality of spaces between the space forming wall portion and the second wall portion.

With such a configuration, by increasing rigidity of the first wall portion of the outer case on a long-side surface side and by forming the plurality of spaces between the space forming wall portion and the second wall portion disposed on a short-side surface side, it is possible to protect the energy storage device from an external force from a first wall portion side and a second wall portion side.

The outer case may further include a partitioning portion disposed between the first member and the energy storage device, and the first member may be inserted between the first wall portion and the partitioning portion.

With such a configuration, by inserting the first member between the partitioning portion and the first wall portion formed on the outer case, the first member can be easily mounted on the first wall portion.

According to still another aspect of the present invention, there is provided an energy storage apparatus including: an energy storage device; and an outer case, wherein the outer case includes: a first wall portion disposed in an opposedly facing manner with a long-side surface of the energy storage device; a second wall portion disposed in an opposedly facing manner with a short-side surface of the energy storage device; a space forming wall portion disposed between the first wall portion and the energy storage device, the space forming wall portion forming a plurality of spaces between the space forming wall portion and the first wall portion, and a plurality of projecting portions disposed between the second wall portion and the energy storage device, the projecting portions projecting toward the energy storage device from the second wall portion.

With such a configuration, in the energy storage apparatus, in the outer case, the plurality of spaces are formed between the first wall portion and the energy storage devices. Further, the plurality of projecting portions are provided between the second wall portion and the energy storage device. Accordingly, it is possible to protect the energy storage device from an external force from a first wall portion side and a second wall portion side by the plurality of spaces on a first wall portion side of the outer case and the plurality of projecting portions on the second wall portion side of the outer case.

According to still another aspect of the present invention, there is provided a method of manufacturing an energy storage apparatus which includes an energy storage device and an outer case, the method including the steps of: disposing the energy storage device in the inside of the outer case; and disposing a first member having rigidity higher than a first wall portion of the outer case at a position sandwiched by the first wall portion of the outer case and the energy storage device before or after the energy storage device disposing step.

With such a configuration, before or after the energy storage device is disposed in the inside of the outer case, the first member having higher rigidity than the first wall portion is disposed at the position where the first member is sandwiched by the first wall portion of the outer case and the energy storage device. With such a configuration, rigidity of the first wall portion of the outer case can be increased by the first member and hence, it is possible to protect the energy storage devices from an external force from a first wall portion side of the outer case.

According to the energy storage apparatus of the present invention, it is possible to properly protect an energy storage device from an external force.

Hereinafter, an energy storage apparatus according to an embodiment of the present invention and a method of manufacturing the same are described with reference to drawings. The embodiment described hereinafter is one preferred specific example of the present invention. In the embodiment described hereinafter, numerical values, shapes, materials, constitutional elements, the arrangement positions and connection states of the constitutional elements, steps in the manufacturing method, the order of the steps and the like are merely examples, and these are not intended to be used for limiting the present invention. Further, out of the constitutional elements in the embodiment described hereinafter, the constitutional elements which are not described in independent claims describing an uppermost concept are described as arbitrary constitutional elements. In the drawings, the constitutional elements are not described strictly accurately in size or the like.

(Embodiment)

First, a configuration of an energy storage apparatus 10 is described.

Figure 2:
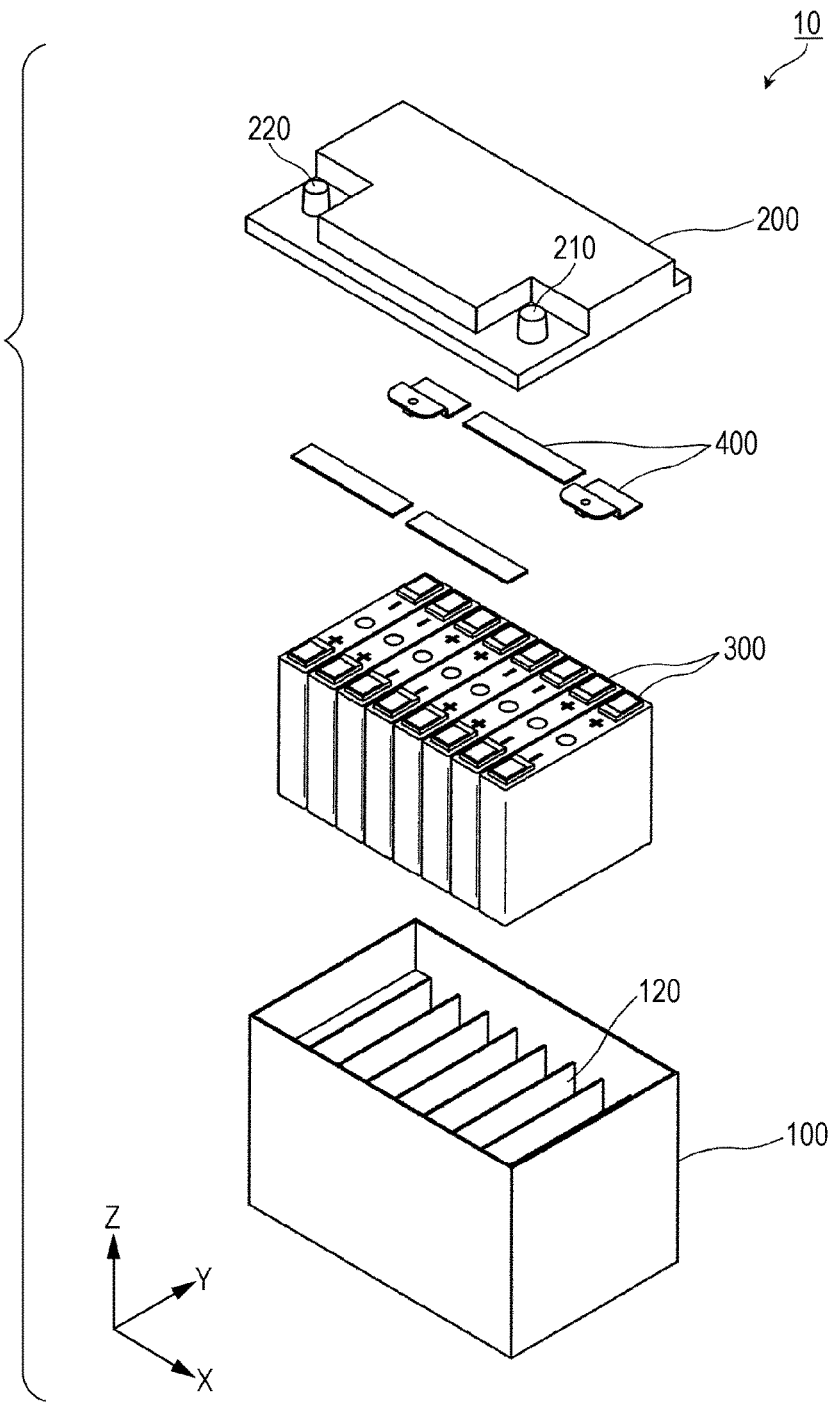
FIG. 2 is an exploded perspective view showing constitutional elements when the energy storage apparatus according to the embodiment of the present invention is exploded.

FIG. 1 is a perspective view showing an external appearance of the energy storage apparatus 10 according to the embodiment of the present invention. FIG. 2 is an exploded perspective view showing constitutional elements when the energy storage apparatus 10 according to the embodiment of the present invention is in a disassembled state.

In these drawings, the Z axis direction is indicated as the vertical direction, and the description is made hereinafter using the Z axis direction as the vertical direction. However, there may be also a case where the Z axis direction is not the vertical direction depending on a mode of use and hence, the Z axis direction is not limited to the vertical direction. The same goes for drawings which are referenced hereinafter.

The energy storage apparatus 10 is an apparatus which can store electricity therein from the outside of the energy storage apparatus 10 or can discharge electricity to the outside of the energy storage apparatus 10. For example, the energy storage apparatus 10 is a battery module used for power storage application, power source application or the like. Particularly, in this embodiment, it is preferable that the energy storage apparatus 10 be used as an engine starting battery for a mobile body such as an automobile, a motorcycle, a water craft, a snowmobile, an agricultural machine or a construction machine, for example. In this case, to facilitate the maintenance, the exchange operation and the like, for example, the energy storage apparatus 10 is mounted in an exposed state at a place which an operator can easily access such as the inside of a hood, the inside of a trunk or the like of the mobile body. Further, the energy storage apparatus 10 can supply electricity to an external load singly (in a single form) or can be charged from an external power source independently (in a single form). That is, although there exists a configuration where a plurality of battery modules (energy storage apparatus) are connected to each other and are housed in a case thus forming a battery pack as a driving power source for an electric vehicle, a plug-in hybrid electric vehicle and the like, the energy storage apparatuses 10 of this embodiment has a configuration different from such a configuration. Further, a battery pack may be configured by electrically connecting the plurality of energy storage apparatuses 10 to each other according to an external load or an external power source.

As shown in FIG. 1 and FIG. 2, the energy storage apparatus 10 includes: an outer case 11; and a plurality of energy storage devices 300 and bus bars 400 which are housed in the outer case 11.

The outer case 11 is a container (module case) having a rectangular shape (box shape) which forms an outer case of the energy storage apparatus 10. That is, the outer case 11 is disposed outside the energy storage devices 300 and the bus bars 400, and the energy storage devices 300 and the like are disposed at predetermined positions so that the energy storage devices 300 and the like can be protected from an impact or the like. In the outer case 11, a housing portion is made of an insulating material such as polycarbonate (PC), polypropylene (PP), polyethylene (PE), a polyphenylene sulfide resin (PPS), polybutylene terephthalate (PBT) or an ABS resin, for example. With such a configuration, the outer case 11 prevents the energy storage devices 300 and the like from coming into contact with a metal member or the like disposed outside the outer case 11.

The outer case 11 has an outer case body 100 and a lid body 200.

The outer case body 100 is a member forming a body portion of the outer case 11 and, to be more specific, is a bottomed rectangular cylindrical housing having an opening at an upper portion thereof. The plurality of energy storage devices 300 are inserted through the opening and are housed in the inside of the outer case body 100. To be more specific, the outer case body 100 includes a plurality of partitioning portions 120 in the inside thereof, and each energy storage device 300 is inserted and housed between two neighboring partitioning portions 120 out of the plurality of partitioning portions 120. The detailed configuration of the outer case body 100 is described later.

The lid body 200 is a member which forms a lid portion of the outer case 11. That is, the lid body 200 is a cover member having a flat rectangular shape which closes an opening of the outer case body 100. A positive electrode external terminal 210 and a negative electrode external terminal 220 are mounted on the lid body 200. The energy storage apparatus 10 storages therein electricity from the outside and discharges electricity to the outside through the positive electrode external terminal 210 and the negative electrode external terminal 220.

As described above, portions of the outer case body 100 other than high rigidity members 101, 102 described later (a housing 110 and the partitioning portions 120 described later) and the lid body 200 are made of an insulating material such as PC, PP, PE, PPS, PBT or an ABS resin, for example. Those portions of the outer case body 100 and the lid body 200 may be made of the same material, or may be made of different materials. Further, electric equipment such as a printed circuit board and a relay may be disposed in the inside of the outer case 11.

The energy storage device 300 is a secondary battery (battery) which can storage and discharge electricity. To be more specific, the energy storage device 300 is a nonaqueous electrolyte secondary battery such as a lithium ion secondary battery. The energy storage device 300 has a flat rectangular shape, and in this embodiment, eight energy storage devices 300 are housed in the outer case 11 in a state where the energy storage devices 300 are arranged in a row in an X axis direction. The energy storage device 300 is not limited to a nonaqueous electrolyte secondary battery, and may be a secondary battery other than a nonaqueous electrolyte secondary battery, or may be a capacitor. Further, also the number of energy storage devices 300 housed in the outer case 11 is not limited. The detailed configuration of the energy storage device 300 is described later.

The bus bars 400 are conductive plate-like members made of metal or the like which are disposed above the plurality of energy storage devices 300 and through which the plurality of energy storage devices 300 are electrically connected to each other. To be more specific, the bus bar 400 connects, with respect to the energy storage devices 300 disposed adjacently to each other, a positive electrode terminal or a negative electrode terminal of one energy storage device 300 and a negative electrode terminal or a positive electrode terminal of the other energy storage device 300 to each other. In this embodiment, every two energy storage devices 300 are connected to each other in parallel by the bus bar 400 as one set of energy storage device group so that four sets of energy storage device groups are formed. Then, four sets of energy storage device groups are connected to each other in series by the bus bars 400. The bus bars 400 may be configured to connect all eight energy storage devices 300 in series, or the bus bars 400 may adopt other configurations.

Figure 3:
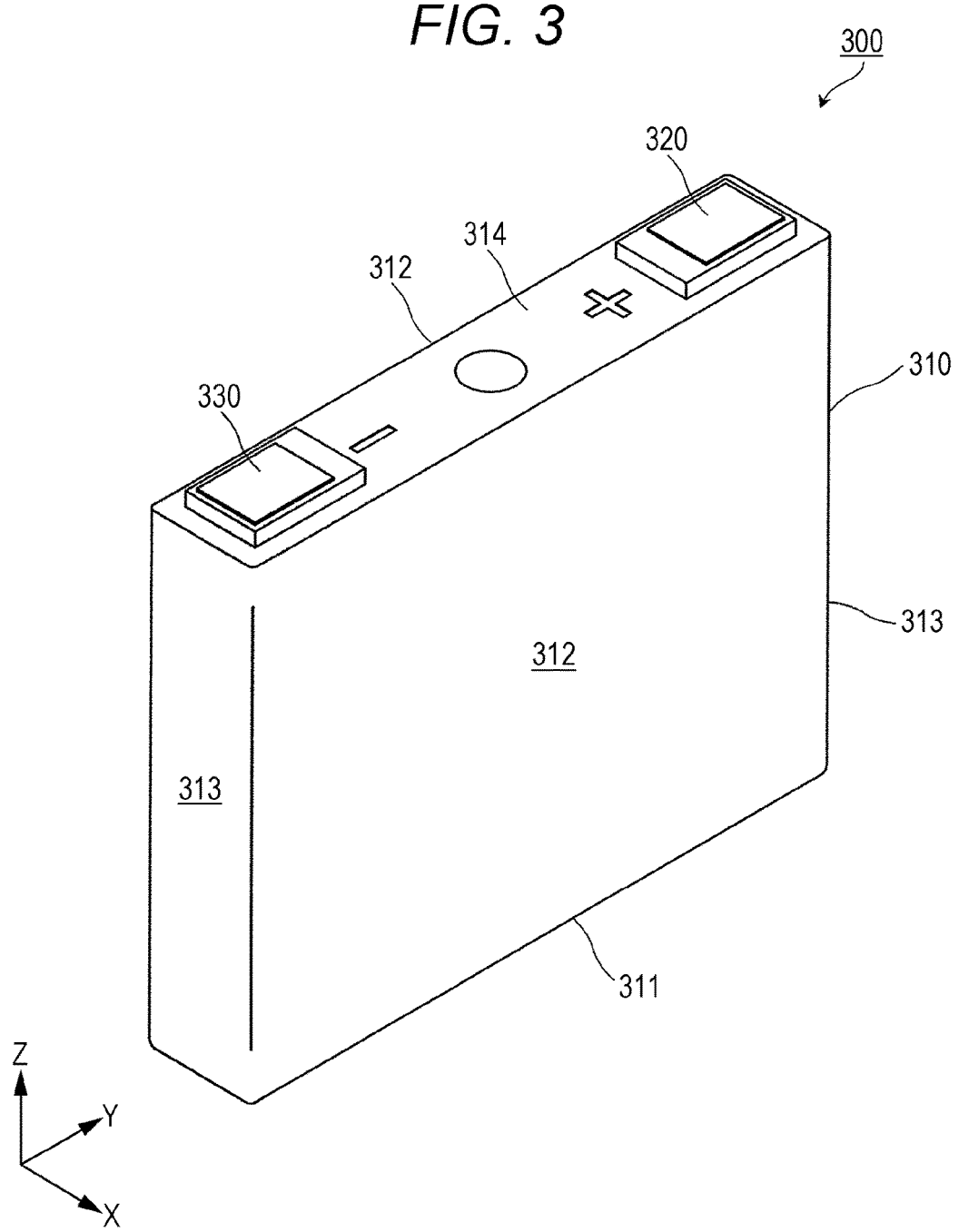
FIG. 3 is a perspective view showing an external appearance of an energy storage device according to the embodiment of the present invention.

Next, the configuration of the energy storage device 300 is described in detail. FIG. 3 is a perspective view showing an external appearance of the energy storage device 300 according to the embodiment of the present invention.

As shown in FIG. 3, the energy storage device 300 includes a container 310, a positive electrode terminal 320 and a negative electrode terminal 330. An electrode assembly (power generating element), a positive electrode current collector, a negative electrode current collector and the like are disposed in the inside of the container 310, and a liquid such as an electrolyte solution (non-aqueous electrolyte) is sealed in the container 310. However, the illustration of these constitutional elements is omitted, and the detailed description with respect to such constitutional elements is also omitted.

The container 310 is a rectangular parallelepiped (angular-shaped) container having; a bottom surface portion 311 disposed on a minus side in the Z axis direction in the drawing; long side surface portions 312 disposed on side surfaces of the container 310 on both sides in the X axis direction; short side surface portions 313 disposed on side surfaces of the container on both sides in the Y axis direction; and a container lid portion 314 disposed on a plus side in the Z axis direction. The bottom surface portion 311 is a rectangular portion which forms a bottom surface of the container 310, the long side surface portions 312 are rectangular portions which form long side surfaces of the container 310, and the short side surface portions 313 are rectangular portions which form short side surfaces of the container 310. Further, the container lid portion 314 is formed of a rectangular member which forms a lid of the container 310.

That is, the container 310 is configured such that a bottomed container body having a rectangular cylindrical shape is formed of the bottom surface portion 311, two long side surface portions 312, and two short side surface portions 313, and an opening of the container body is closed by the container lid portion 314. To be more specific, the container 310 is configured such that the inside of the container 310 can be hermetically sealed by joining the container body and the container lid portion 314 to each other by welding or the like after the electrode assembly and the like are housed in the inside of the container body.

Although a material for forming the container 310 (the container body and the container lid portion 314) is not particularly limited, it is preferable that the container 310 be made of weldable metal such as stainless steel, aluminum or an aluminum alloy, for example. Although a safety valve for releasing a pressure in the inside of the container 310 is mounted on the container lid portion 314, the detailed description of the safety valve is omitted.

The electrode assembly housed in the container 310 may be a winding-type electrode assembly formed by winding a positive electrode, a negative electrode and a separator, or may be a stacked-type electrode assembly where flat-plate-like plates are stacked to each other. Further, as a positive active material and a negative active material used for forming the electrode assembly, known materials can be suitably used provided that performance of the energy storage device 300 is not impaired. Also with respect to an electrolyte solution sealed in the container 310, a kind of the electrolyte solution is not particularly limited and various kinds of electrolyte solutions can be selected provided that performance of the energy storage device 300 is not impaired.

The positive electrode terminal 320 is an electrode terminal electrically connected to a positive electrode of an electrode assembly through a positive electrode current collector. The negative electrode terminal 330 is an electrode terminal electrically connected to a negative electrode of an electrode assembly through a negative electrode current collector. Both the positive electrode terminal 320 and the negative electrode terminal 330 are mounted on the container lid portion 314. That is, the positive electrode terminal 320 and the negative electrode terminal 330 are metal-made electrode terminals through which electricity stored in the electrode assembly is discharged to a space outside the energy storage device 300, and through which electricity is introduced into a space inside the energy storage device 300 for storing the electricity in the electrode assembly. In this embodiment, the energy storage devices 300 are disposed in a state where the positive electrode terminals 320 and the negative electrode terminals 330 are directed upward.

To be more specific, the positive electrode terminal 320 of the energy storage device 300 disposed on a positive electrode external terminal 210 side (in FIG. 2, a plus side in the X axis direction) out of the plurality of energy storage devices 300 provided to the energy storage apparatus 10 is connected to the positive electrode external terminal 210 through the bus bar 400. In the same manner, the negative electrode terminal 330 of the energy storage device 300 disposed on a negative electrode external terminal 220 side (in FIG. 2, a minus side in the X axis direction) out of the plurality of energy storage devices 300 is connected to the negative electrode external terminal 220 through the bus bar 400. The positive electrode terminal 320 or the negative electrode terminal 330 of another energy storage device 300 is connected to the positive electrode terminal 320 or the negative electrode terminal 330 of still another energy storage device 300 through the bus bars 400.

Figure 4:
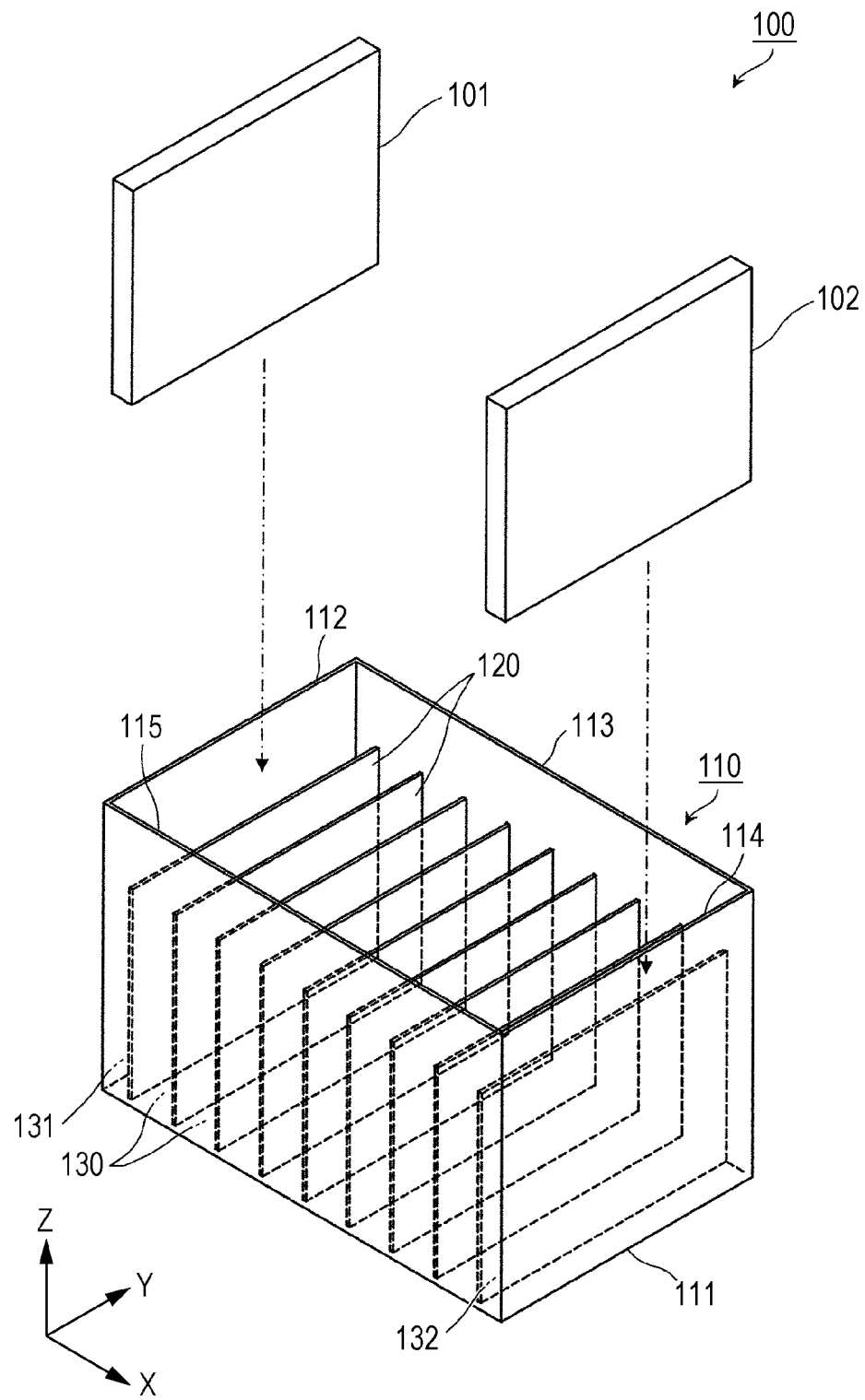
FIG. 4 is a perspective view showing a configuration of an outer case body according to the embodiment of the present invention.
Figure 5A:
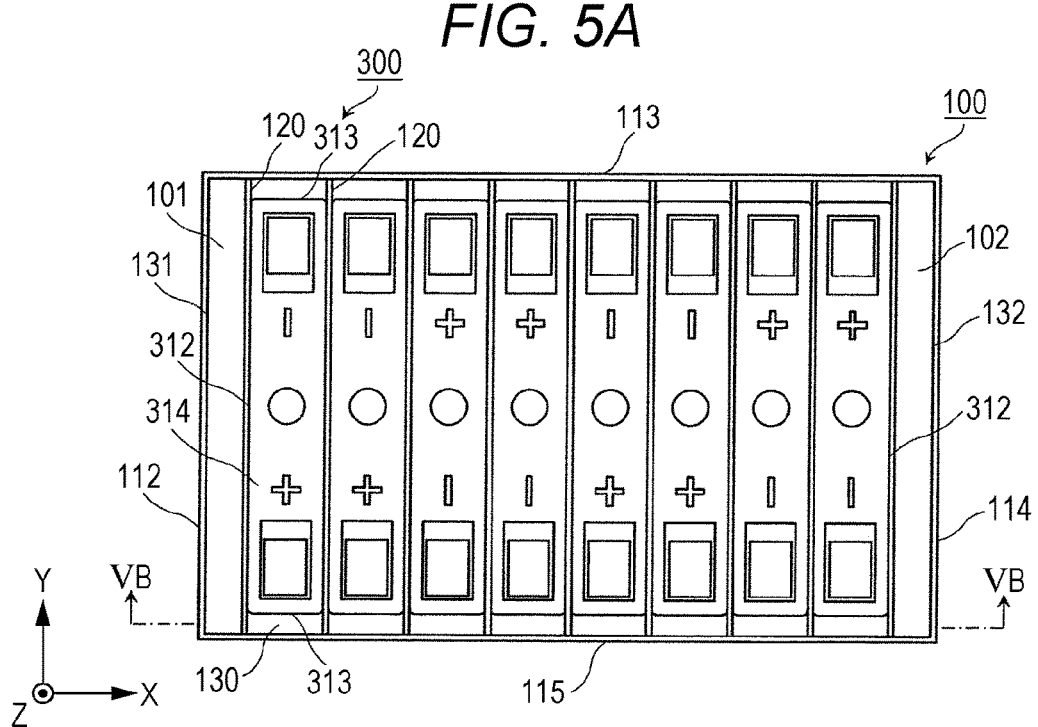
FIG. 5A is a plan view showing a configuration where the energy storage devices according to the embodiment of the present invention are housed in the inside of the outer case body.
Figure 5B:
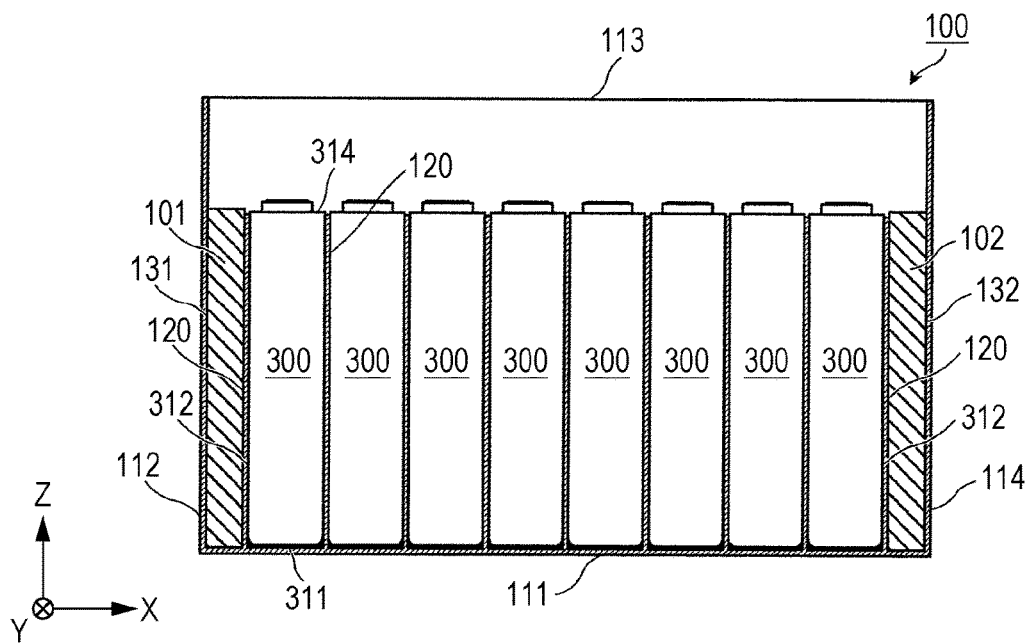
FIG. 5B is a cross-sectional view showing a configuration where the energy storage devices according to the embodiment of the present invention are housed in the inside of the outer case body.

Next, the configuration of the outer case body 100 of the outer case 11 is described in detail. FIG. 4 is a perspective view showing a configuration of the outer case body 100 according to the embodiment of the present invention. FIG. 5A is a plan view showing a configuration where the energy storage devices 300 according to the embodiment of the present invention are housed in the inside of the outer case body 100. To be more specific, FIG. 5A is a plan view of a configuration where the lid body 200 and the bus bars 400 are removed from the energy storage apparatus 10 as viewed from a plus side in the Z axis direction. FIG. 5B is a cross-sectional view showing a configuration where the energy storage devices 300 according to the embodiment of the present invention are housed in the inside of the outer case body 100. To be more specific, FIG. 5B is a cross-sectional view of the configuration shown in FIG. 5A taken along a line VB-VB.

As shown in these drawings, the outer case body 100 includes a housing 110, partitioning portions 120, and high rigidity members 101, 102. The housing 110 has a bottom wall portion 111 disposed on a minus side in the Z axis direction, a side wall portion 112 disposed on a minus side in the X axis direction, a side wall portion 113 disposed on a plus side in the Y axis direction, a side wall portion 114 disposed on a plus side in the X axis direction, and a side wall portion 115 disposed on a minus side in the Y axis direction.

The bottom wall portion 111 is a rectangular and flat-plate-like portion which forms a bottom wall of the outer case body 100. The side wall portions 112, 114 are rectangular and flat-plate-like portions which are formed in a raised manner from short side edges of the bottom wall portion 111 and form short side walls of the outer case body 100. The side wall portions 113, 115 are rectangular and flat-plate-like portions which are formed in a raised manner from long side edges of the bottom wall portion 111 and form long side walls of the outer case body 100. That is, the housing 110 is a bottomed rectangular cylindrical member which is formed of the bottom wall portion 111 and the side wall portions 112, 113, 114, 115 which surround four sides of the bottom wall portion 111, and an opening on an upper portion thereof.

To be more specific, the side wall portion 112 is a first wall portion which is disposed in an oppositely facing manner with a side surface of the energy storage devices 300 (a long side surface portion 312 on a minus side in the X axis direction). The side wall portion 113 is a second wall portion which is disposed at a position where the side wall portion 113 oppositely faces another side surface (short side surface portions 313 on a plus side in the Y axis direction) of the energy storage devices 300 and is disposed adjacently to the side wall portion 112 (first wall portion). The side wall portion 114 is a third wall portion which is disposed at a position where the side wall portion 114 oppositely faces still another side surface (long side surface portion 312 on a plus side in the X axis direction) of the energy storage device 300 and is disposed adjacently to the side wall portion 113 (second wall portion). That is, the side wall portion 114 is the third wall portion which is disposed at a position where the side wall portion 114 sandwiches the plurality of energy storage devices 300 together with the side wall portion 112 (first wall portion) in the arrangement direction (X axis direction) of the plurality of energy storage devices 300. The side wall portion 115 is a fourth wall portion which is disposed at a position where the side wall portion 115 oppositely faces still another side surface (short side surface portions 313 on a minus side in the Y axis direction) of the energy storage device 300 and is disposed adjacently to the side wall portion 112 (first wall portion) and the side wall portion 114 (third wall portion). That is, the side wall portion 115 is the fourth wall portion which is disposed at the position where the side wall portion 115 sandwiches the plurality of energy storage devices 300 together with the side wall portion 113 (second wall portion) in a direction (Y axis direction) intersecting with the arrangement direction of the plurality of energy storage devices 300. The side wall portions 112 to 115 (first wall portion to fourth wall portion) have insulating property as described above.

The partitioning portions 120 are rectangular and flat-plate-like partitioning plates which are disposed in the inside of the housing 110, and separate the plurality of energy storage devices 300 from each other. Each partitioning portion 120 is disposed between each two neighboring energy storage devices 300 out of the plurality of energy storage devices 300, and the partitioning portion 120 is also disposed at end portions of the unit formed of the plurality of energy storage devices 300. That is, the partitioning portions 120 are disposed at positions where the partitioning portions 120 sandwich each energy storage device 300 from both sides. To be more specific, the partitioning portions 120 are disposed in an extending manner between two side wall portions 113, 115, and are connected to the bottom wall portion 111 and two side wall portions 113, 115. In this embodiment, nine partitioning portions 120 are disposed for eight energy storage devices 300. In this embodiment, the partitioning portions 120 are formed integrally with the housing 110. However, the partitioning portions 120 may be formed separately from the housing 110.

Due to the partitioning portions 120, energy storage device housing portions 130 are formed in the inside of the outer case body 100. The energy storage device housing portion 130 is a rectangular parallelepiped space surrounded by two partitioning portions 120, and the bottom wall portion 111, the side wall portion 113 and the side wall portion 115 of the housing 110, and the energy storage device 300 is housed in the inside of the energy storage device housing portion 130. That is, the energy storage device housing portions 130 are housing portions for the energy storage devices 300 and are formed by partitioning an inner space of the housing 110 by the partitioning portions 120. By inserting the energy storage device 300 between two partitioning portions 120 from the opening formed on an upper portion of the housing 110, the energy storage device 300 is housed in the energy storage device housing portion 130 formed in the inside of the outer case body 100. In this embodiment, eight energy storage device housing portions 130 are disposed corresponding to eight energy storage devices 300.

In such a configuration, the plurality of energy storage devices 300 are disposed such that each of the plurality of energy storage devices 300 is housed in each of the plurality of energy storage device housing portions 130 partitioned by the partitioning portions 120 in the inside of the outer case body 100. To be more specific, each energy storage device 300 is housed at a center portion of the energy storage device housing portion 130 in a state where the bottom surface portion 311 opposedly faces the bottom wall portion 111 of the outer case body 100, two long side surface portions 312 are brought into contact with two partitioning portions 120, and the container lid portion 314 is directed upward.

Out of the plurality of partitioning portions 120, between the partitioning portion 120 on one end and the side wall portion 112 and between the partitioning portion 120 on the other end and the side wall portion 114, high rigidity member housing portions 131, 132 for housing the high rigidity members 101, 102 are formed respectively.

The high rigidity member housing portion 131 is a rectangular parallelepiped space which is surrounded by the partitioning portion 120 disposed at an end portion of the unit formed of the plurality of energy storage devices 300 on a minus side in the X axis direction, the bottom wall portion 111, the side wall portion 112, the side wall portion 113 and the side wall portion 115 of the housing 110, and the high rigidity member 101 is housed in the high rigidity member housing portion 131. That is, the high rigidity member housing portion 131 is a housing portion for housing the high rigidity member 101 which is formed by partitioning the inner space of the housing 110 by the partitioning portion 120, and the high rigidity member 101 is housed in the high rigidity member housing portion 131 by being inserted into the high rigidity member housing portion 131 from the opening formed on the upper portion of the housing 110.

The high rigidity member housing portion 132 is a rectangular parallelepiped space which is surrounded by the partitioning portion 120 disposed at the other end portion of the unit formed of the plurality of energy storage devices 300 on a plus side in the X axis direction, and the bottom wall portion 111, the side wall portion 113, the side wall portion 114 and the side wall portion 115 of the housing 110, and the high rigidity member 102 is housed in the high rigidity member housing portion 132. That is, the high rigidity member housing portion 132 is a housing portion of the high rigidity member 102 formed by partitioning the inner space of the housing 110 by the partitioning portion 120, and the high rigidity member 102 is housed in the high rigidity member housing portion 132 by being inserted into the high rigidity member housing portion 132 from the opening formed on the upper portion of the housing 110.

The high rigidity members 101, 102 are housed in the high rigidity member housing portions 131, 132 which are formed between partitioning portions 120 at both ends of the unit of the plurality of energy storage devices 300 and the side wall portions 112, 114 respectively, and are rectangular flat-plate-like conductive members made of metal or the like. That is, while the side wall portions 112 to 115 of the outer case body 100 are resin-made members, the high rigidity members 101, 102 are metal-made members. As a material for forming the high rigidity members 101, 102, aluminum, a plated steel plate, a high tensile steel plate, stainless steel, magnesium or the like can be named, for example. However, a material for forming the high rigidity members 101, 102 is not particularly limited provided that the material has higher rigidity than the wall portions of the outer case body 100 on which the high rigidity members 101, 102 are mounted.

To be more specific, the high rigidity member 101 is the first member which is disposed between the side wall portion 112 (first wall portion) and the unit formed of the plurality of energy storage devices 300, is mounted on the side wall portion 112 (first wall portion), and has higher rigidity than the side wall portion 112 (first wall portion). To be more specific, the high rigidity member 101 is disposed in a state where the high rigidity member 101 is inserted between the side wall portion 112 and the partitioning portion 120. That is, the partitioning portion 120 is disposed between the high rigidity member 101 and the energy storage device 300. Further, the high rigidity member 101 has substantially the same shape as the high rigidity member housing portion 131 as viewed in a top plan view (as viewed from a plus side in the Z axis direction), extends over two short side surface portions 313 of the energy storage device 300, and extends to the container lid portion 314 from the bottom surface portion 311. That is, the high rigidity member 101 is disposed so as to cover the entire surface of the long side surface portion 312 of the energy storage device 300 with the partitioning portion 120 sandwiched therebetween.

In this embodiment, "has higher rigidity" means a state where the member is resistant to an external force and, for example, can be defined as a state where a change in size of the member is small when a bending force or a torsional force is applied to the member. That is, for example, "the high rigidity member 101 has higher rigidity than the side wall portion 112" means that when center portions of regions of the high rigidity member 101 and the side wall portion 112 having the same size are each pushed by the same force, a change in size (deflection amount) of the high rigidity member 101 is smaller than a change in size (deflection amount) of the side wall portion 112. It may be also expressed that a force to be applied to the high rigidity member 101 for generating a change in size is larger than a force to be applied to the side wall portion 112 for generating the change in size. The definition of rigidity is not limited to the above-mentioned definition, and rigidity may be defined within a scope that those who are skilled in the art can construe in a usual practice. The same goes for the high rigidity members other than the high rigidity member 101.

The high rigidity member 102 is the third member which is disposed between the side wall portion 114 (third wall portion) and the unit formed of the plurality of energy storage devices 300, and is mounted on the side wall portion 114 (third wall portion), and has higher rigidity than the side wall portion 114 (third wall portion). To be more specific, the high rigidity member 102 is disposed in a state where the high rigidity member 102 is inserted between the side wall portion 114 and the partitioning portion 120. That is, the partitioning portion 120 is disposed between the high rigidity member 102 and the energy storage device 300. Further, in the same manner as the high rigidity member 101, the high rigidity member 102 is disposed so as to cover the entire surface of the long side surface portion 312 of the energy storage device 300 with the partitioning portion 120 sandwiched therebetween.

Next, a method of manufacturing the energy storage apparatus 10 is described. In the description made hereinafter, among steps of the method of manufacturing the energy storage apparatus 10, the step of disposing the energy storage devices 300 and the high rigidity members 101, 102 in the inside of the housing 110 of the outer case body 100 is described in detail, and the description of other steps is omitted.

Figure 6A:
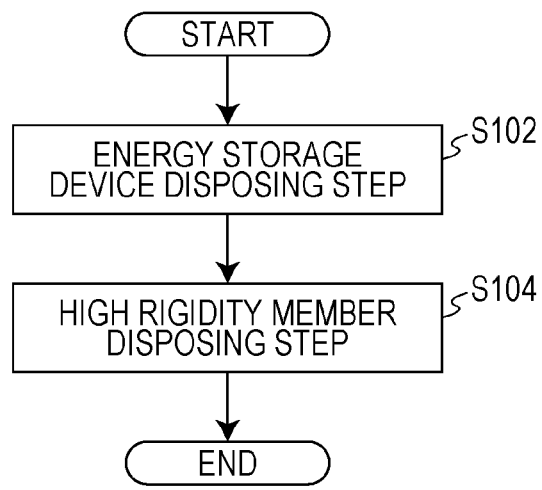
FIG. 6A is a flowchart showing steps of disposing the energy storage device and a high rigidity member in the inside of a housing of the outer case body in a method of manufacturing an energy storage apparatus according to the embodiment of the present invention.

FIG. 6A is a flowchart showing the step of disposing the energy storage devices 300 and the high rigidity members 101, 102 in the inside of the housing 110 of the outer case body 100 in the method of manufacturing the energy storage apparatus 10 according to the embodiment of the present invention.

As shown in FIG. 6A, the energy storage devices 300 are disposed in the inside of the outer case 11 in the energy storage device disposing step (S102). To be more specific, the energy storage devices 300 are inserted into and are disposed in the energy storage device housing portions 130 of the outer case body 100.

After the energy storage device disposing step is performed, the high rigidity member disposing step is performed. In the high rigidity member disposing step, the high rigidity member having higher rigidity than the side wall portion is disposed at the position sandwiched between the side wall portion of the outer case 11 and the energy storage device 300 (S104). To be more specific, in a first member disposing step, the high rigidity member 101 (first member) having higher rigidity than the side wall portion 112 (first wall portion) is disposed at the position sandwiched between the side wall portion 112 (first wall portion) of the outer case 11 and the energy storage device 300. Then, in a third member disposing step, the high rigidity member 102 (third member) having higher rigidity than the side wall portion 114 (third wall portion) is disposed at the position sandwiched between the side wall portion 114 (third wall portion) of the outer case 11 and the energy storage device 300.

Figure 6B:
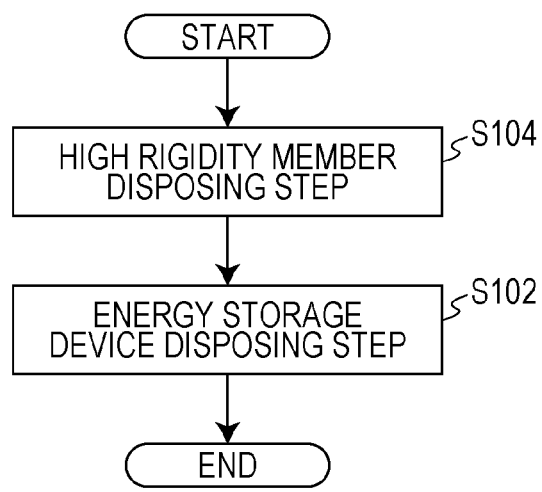
FIG. 6B is a flowchart showing other steps of disposing the energy storage device and the high rigidity member in the inside of the housing of the outer case body in the method of manufacturing an energy storage apparatus according to the embodiment of the present invention.

The high rigidity member disposing step may be performed before the energy storage device disposing step is performed. FIG. 6B is a flowchart showing another step of disposing the energy storage devices 300 and the high rigidity members 101, 102 in the inside of the housing 110 of the outer case body 100 in the method of manufacturing the energy storage apparatus 10 according to the embodiment of the present invention.

As shown in FIG. 6B, before the energy storage device disposing step is performed, in the high rigidity member disposing step, a high rigidity member having higher rigidity than the side wall portion is disposed at a position sandwiched between the side wall portions of the outer case 11 and the energy storage devices 300 (S104). The high rigidity member disposing step in FIG. 6B is substantially equal to the high rigidity member disposing step described with reference to FIG. 6A and hence, the detailed description of the high rigidity member disposing step in FIG. 6B is omitted.

In the energy storage device disposing step, the energy storage devices 300 are disposed in the inside of the outer case 11 (S102). The energy storage device disposing step shown in FIG. 6B is substantially equal to the energy storage device disposing step described with reference to FIG. 6A and hence, the detailed description of the energy storage device disposing step in FIG. 6B is omitted.

As has been described heretofore, in the energy storage apparatus 10 according to the embodiment of the present invention, the outer case 11 includes the first member between the first wall portion and the energy storage device. The first member is mounted on the first wall portion and has higher rigidity than the first wall portion. That is, the outer case includes the metal-made first member mounted on the resin-made first wall portion. With such a configuration, rigidity of the first wall portion of the outer case 11 can be increased by the first member and hence, it is possible to protect the energy storage devices 300 from an external force from a first wall portion side of the outer case 11.

Further, the first member is disposed not outside but inside the outer case 11 and hence, it is possible to prevent falling of the first member.

The outer case 11 includes the third member between the third wall portion which sandwiches the plurality of energy storage devices 300 with the first wall portion and the unit formed of the plurality of energy storage devices 300. The third member is mounted on the third wall portion and has higher rigidity than the third wall portion. With such a configuration, rigidity of two wall portions which sandwich the plurality of energy storage devices 300 therebetween can be further increased by the third member and hence, it is possible to protect the energy storage devices 300 from an external force from two wall portion sides. Further, by sandwiching the plurality of energy storage devices 300 by the first member and the third member, the expansion of the energy storage devices 300 can be suppressed.

The first wall portion has insulating property and hence, it is possible to ensure insulation between the energy storage apparatus 10 and external equipment. Further, even when there is a possibility that the first wall portion is brought into contact with a human hand at the time of exchanging the energy storage apparatus 10 or the like, the first wall portion has insulating property and hence, safety can be enhanced. The same goes for the second wall portion to the fourth wall portion.

By inserting the first member between the partitioning portion 120 formed on the outer case 11 and the first wall portion, the first member can be easily mounted on the first wall portion. The same goes for the third member.

In the method of manufacturing the energy storage apparatus 10 according to the embodiment of the present invention, before or after the energy storage devices 300 are disposed in the inside of the outer case 11, the first member having higher rigidity than the first wall portion is disposed at the position sandwiched between the first wall portion of the outer case 11 and the energy storage device 300. With such a configuration, rigidity of the first wall portion of the outer case 11 can be increased by the first member and hence, it is possible to protect the energy storage devices 300 from an external force from the first wall portion side of the outer case 11. The same goes for the third member.

(Modification 1)

Next, a modification 1 of the above-mentioned embodiment is described. In the above-mentioned embodiment, the outer case body 100 includes the partitioning portions 120 which are disposed in an extending manner between the side wall portion 113 and the side wall portion 115. However, in this modification, an outer case body includes rib-shaped partitioning portions.

Figure 7:
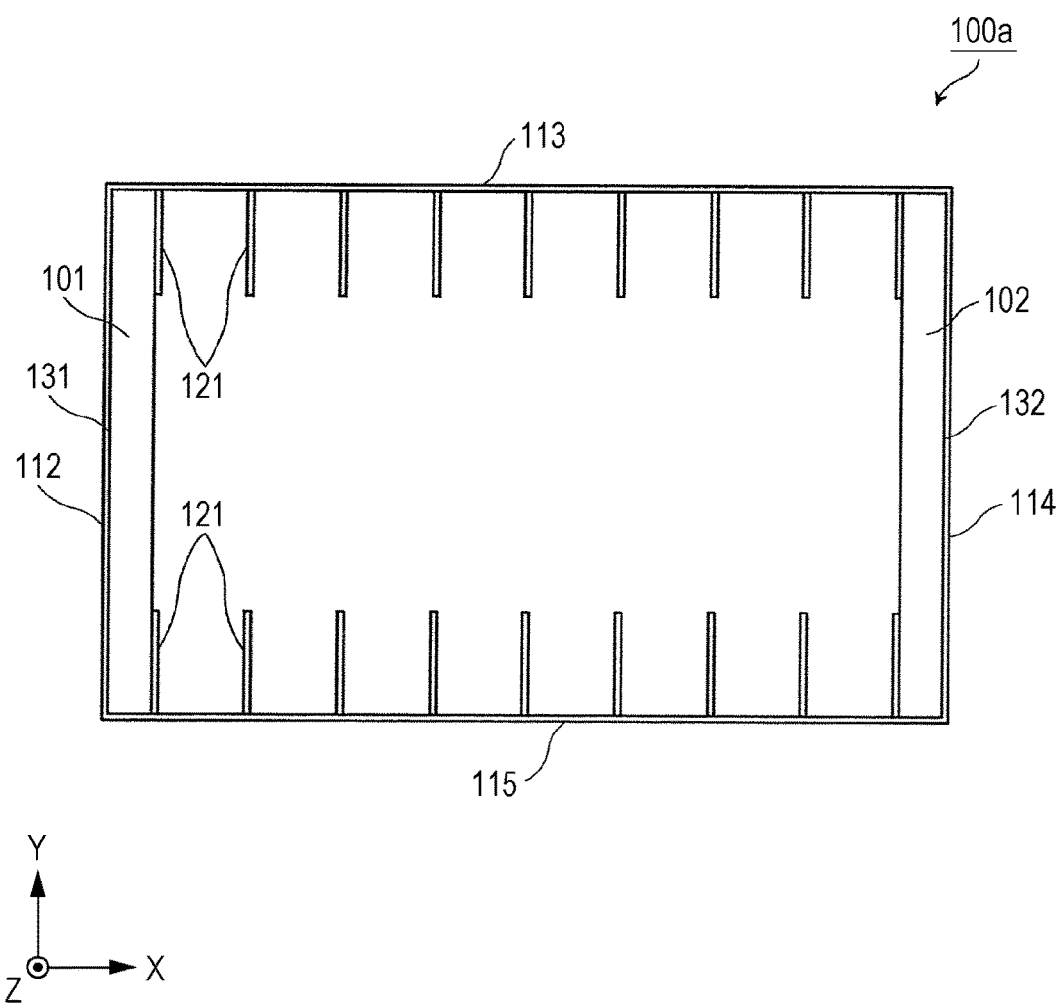
FIG. 7 is a plan view showing a configuration of an outer case body according to a modification 1 of the embodiment of the present invention.

FIG. 7 is a plan view showing a configuration of the outer case body 100a according to the modification 1 of the embodiment of the present invention. To be more specific, FIG. 7 is a view which corresponds to the outer case body 100 shown in FIG. 5A.

As shown in FIG. 7, the outer case body 100a includes partitioning portions 121 in place of the partitioning portions 120 in the outer case body 100 in the above-mentioned embodiment. The partitioning portion 121 is a rectangular and flat-plate-like rib projecting from the side wall portion 113, 115. That is, the partitioning portion 121 is configured such that a center portion of the partitioning portion 120 in the above-mentioned embodiment is cut away.

Further, high rigidity members 101, 102 are housed in high rigidity member housing portions 131, 132 formed by the partitioning portions 121. The partitioning portions 121 are not limited to the above-mentioned shape in the embodiment provided that the partitioning portions 121 form the high rigidity member housing portions 131, 132 and the high rigidity members 101, 102 can be housed in the high rigidity member housing portions 131, 132.

As has been described heretofore, the energy storage apparatus 10 according to the modification 1 of the embodiment of the present invention can obtain substantially the same advantageous effect as the above-mentioned embodiment. Particularly, in this modification, the partitioning portions 121 can be made small and hence, an amount of a material used for forming the outer case body 100a can be reduced.

(Modification 2)

Next, a modification 2 of the above-mentioned embodiment is described. In the above-mentioned embodiment, the high rigidity members 101, 102 are housed in the high rigidity member housing portions 131, 132 formed by the partitioning portions 120 respectively. However, in this modification, the high rigidity members 101, 102 are fixed to side wall portions of the outer case body by adhesion.

Figure 8:
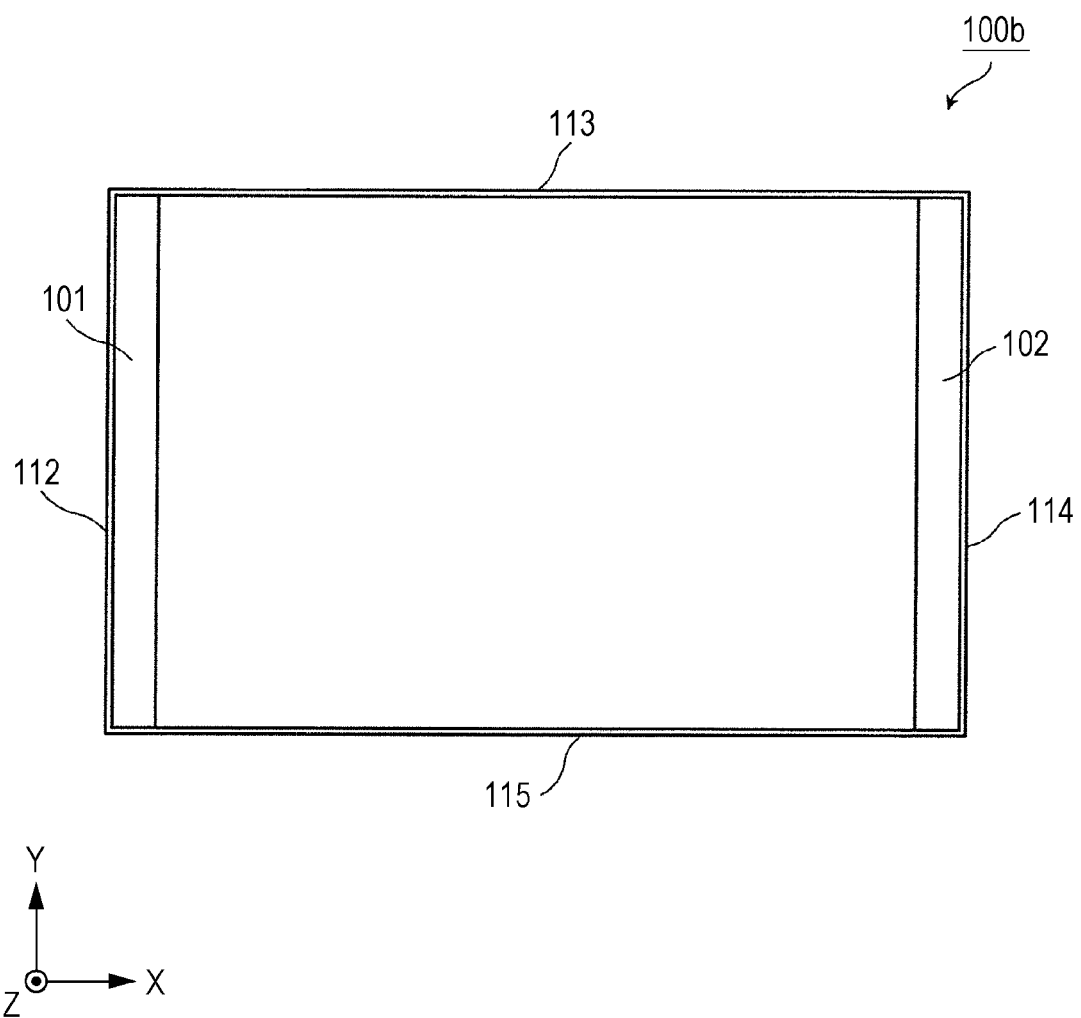
FIG. 8 is a plan view showing a configuration of an outer case body according to a modification 2 of the embodiment of the present invention.

FIG. 8 is a plan view showing a configuration of an outer case body 100b according to the modification 2 of the embodiment of the present invention. To be more specific, FIG. 8 is a view which corresponds to the outer case body 100 shown in FIG. 5A.

As shown in FIG. 8, the outer case body 100b does not include constitutional elements which correspond to the partitioning portions 120 in the outer case body 100 in the above-mentioned embodiment. Further, the high rigidity member 101 (first member) and the high rigidity member 102 (third member) are fixed to the side wall portion 112 (first wall portion) and the side wall portion 114 (third wall portion) by adhesion respectively. For example, the high rigidity members 101, 102 are adhered to the side wall portions 112, 114 respectively using an adhesive agent, a double-sided adhesive tape, a magic tape (registered trademark), a Velcro tape (registered trademark) or the like.

To ensure insulation between the high rigidity members 101, 102 and the energy storage devices 300, the high rigidity members 101, 102 or the energy storage devices 300 may be covered by an insulating member (insulating paint, insulating film or the like). An insulating member may be disposed between the high rigidity members 101, 102 and the energy storage devices 300. An insulating member (partitioning plate) may be disposed between two neighboring energy storage devices 300.

As has been described heretofore, the energy storage apparatus 10 according to the modification 2 of the embodiment of the present invention can obtain substantially the same advantageous effect as the above-mentioned embodiment. Particularly, in this modification, the first member can be easily mounted on the first wall portion by adhering the first member to the first wall portion. The same goes for the third member.

(Modification 3)

Next, a modification 3 of the above-mentioned embodiment is described. In the above-mentioned embodiment, the high rigidity members 101, 102 are housed in the high rigidity member housing portions 131, 132 formed by the partitioning portions 120 respectively. However, in this modification, the high rigidity members 101, 102 are formed on the side wall portions of the outer case body by insert molding.

Figure 9:
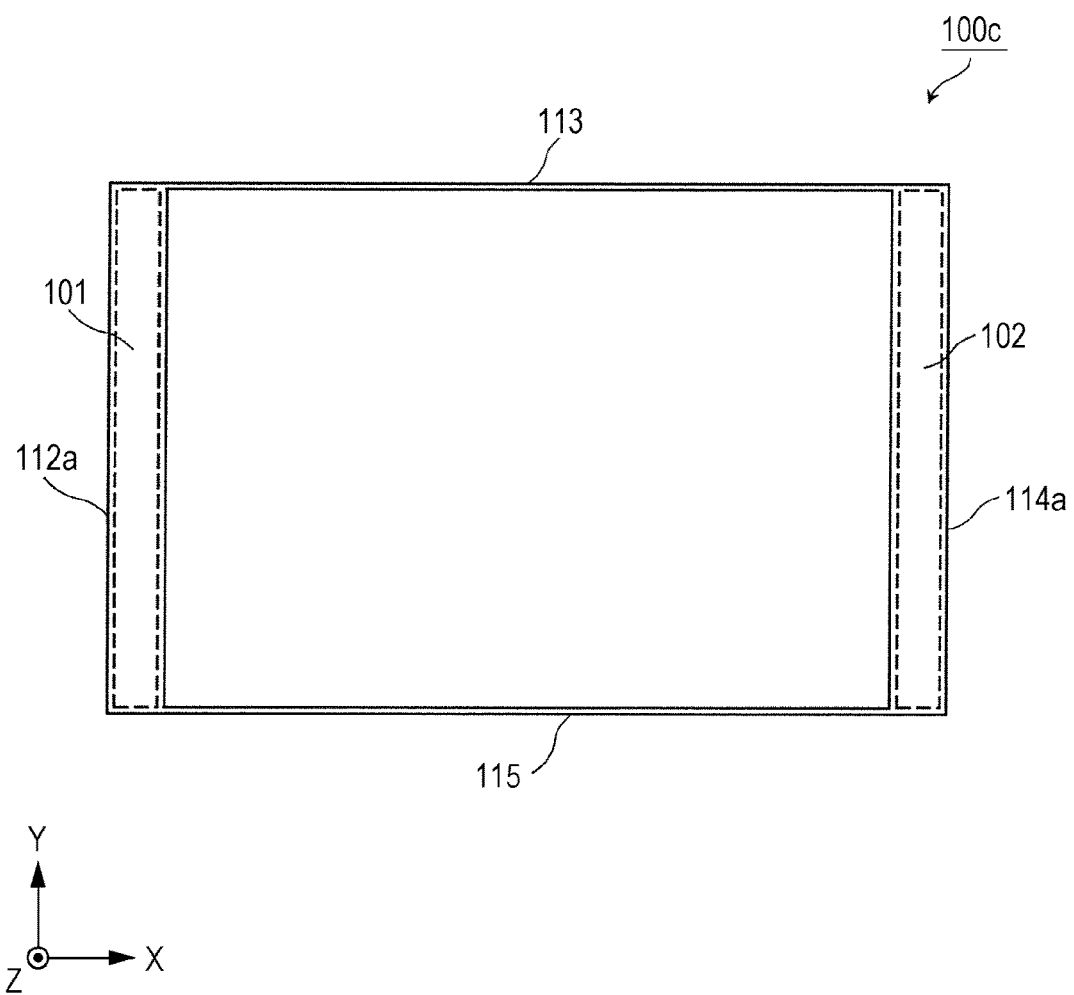
FIG. 9 is a plan view showing a configuration of an outer case body according to a modification 3 of the embodiment of the present invention.

FIG. 9 is a plan view showing a configuration of an outer case body 100c according to the modification 3 of the embodiment of the present invention. To be more specific, FIG. 9 is a view which corresponds to the outer case body 100 shown in FIG. 5A.

As shown in FIG. 9, the outer case body 100c does not include constitutional elements which corresponds to the partitioning portions 120 in the outer case body 100 of the above-mentioned embodiment. Meanwhile, the high rigidity member 101 (first member) and the high rigidity member 102 (third member) are formed on a side wall portion 112a (first wall portion) and a side wall portion 114a (third wall portion) by insert molding respectively.

To ensure insulation between two neighboring energy storage devices 300, the energy storage devices 300 may be covered by an insulating member (insulating paint, insulating film or the like). Alternatively, an insulating member (partitioning plate) may be disposed between two energy storage devices 300 disposed adjacently to each other.

As has been described heretofore, the energy storage apparatus 10 according to the modification 3 of the embodiment of the present invention can obtain substantially the same advantageous effect as the above-mentioned embodiment. Particularly, in this modification, the first member is formed on the first wall portion by insert molding and hence, a step of mounting the first member on the first wall portion can be omitted so that the energy storage apparatus 10 can be easily assembled. Further, the first wall portion is formed of an insulating member and hence, it is possible to easily ensure insulation between the first member and the energy storage device 300. The same goes for the third member.

(Modification 4)

Next, a modification 4 of the above-mentioned embodiment is described. In the above-mentioned embodiment, the outer case 11 includes two high rigidity members 101, 102. However, in this modification, an outer case 11 includes four high rigidity members.

Figure 10:
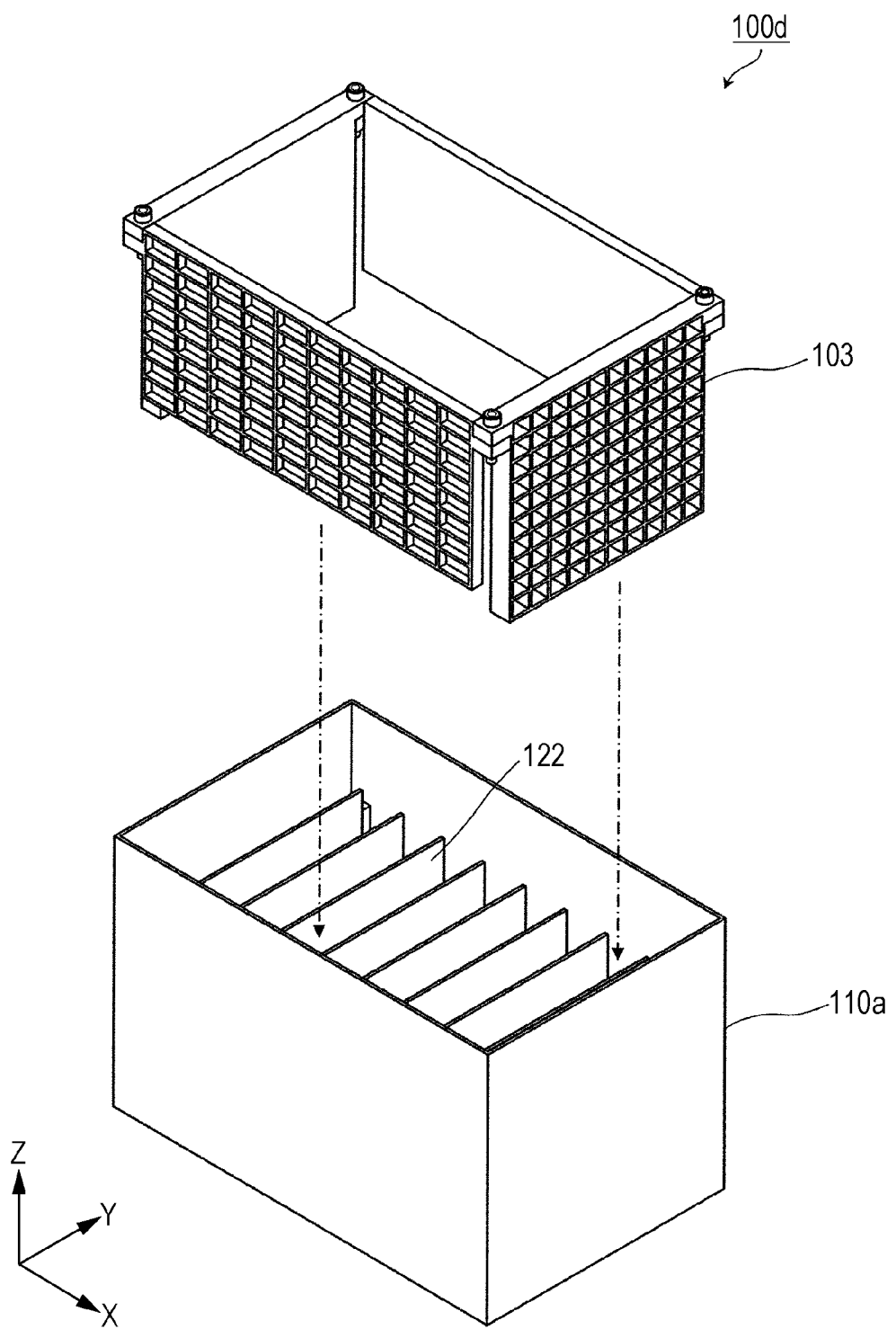
FIG. 10 is a perspective view showing a configuration of an outer case body according to a modification 4 of the embodiment of the present invention.
Figure 11:
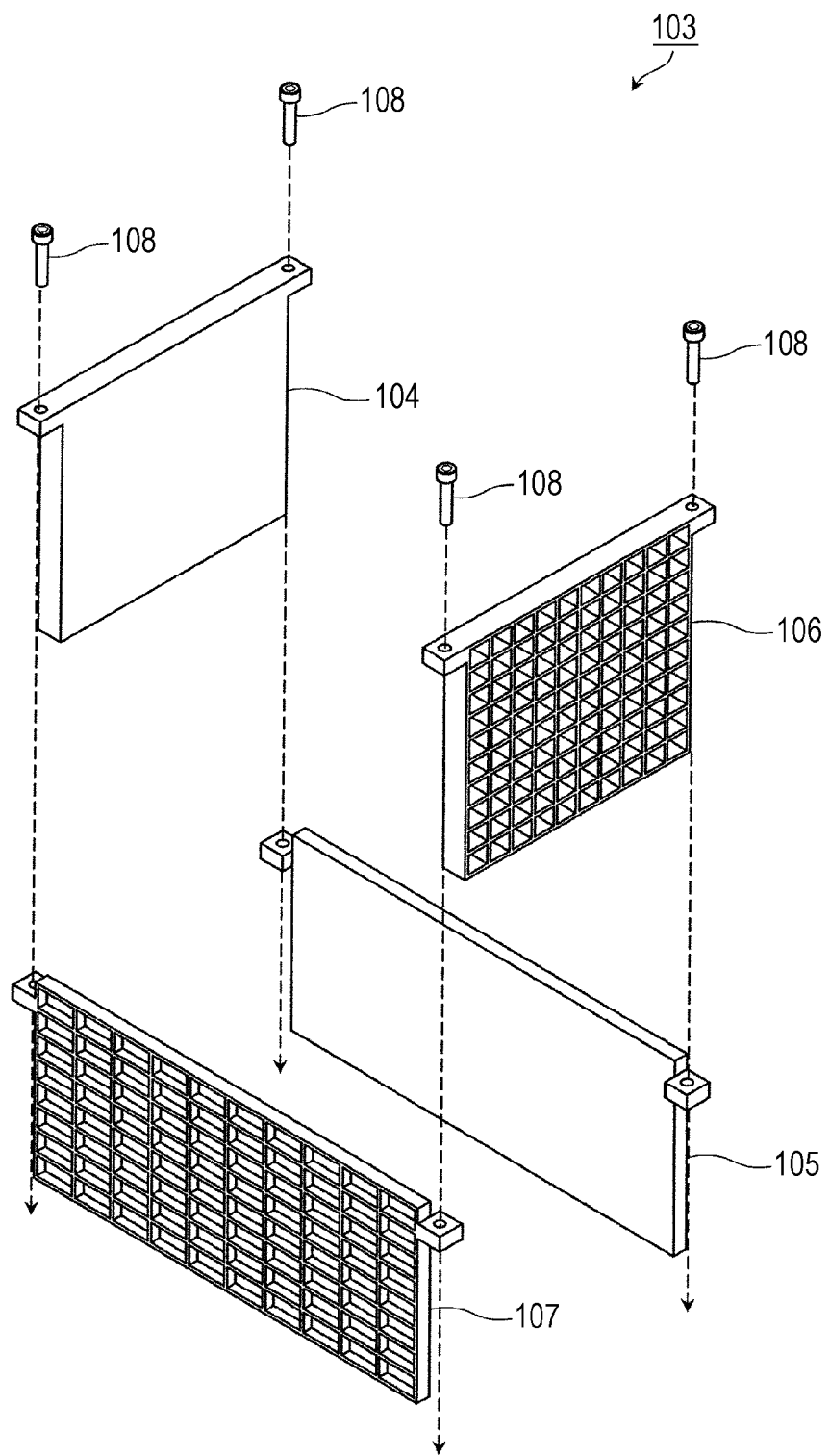
FIG. 11 is a perspective view showing a configuration of a high rigidity unit of the outer case body according to the modification 4 of the embodiment of the present invention.
Figure 12:
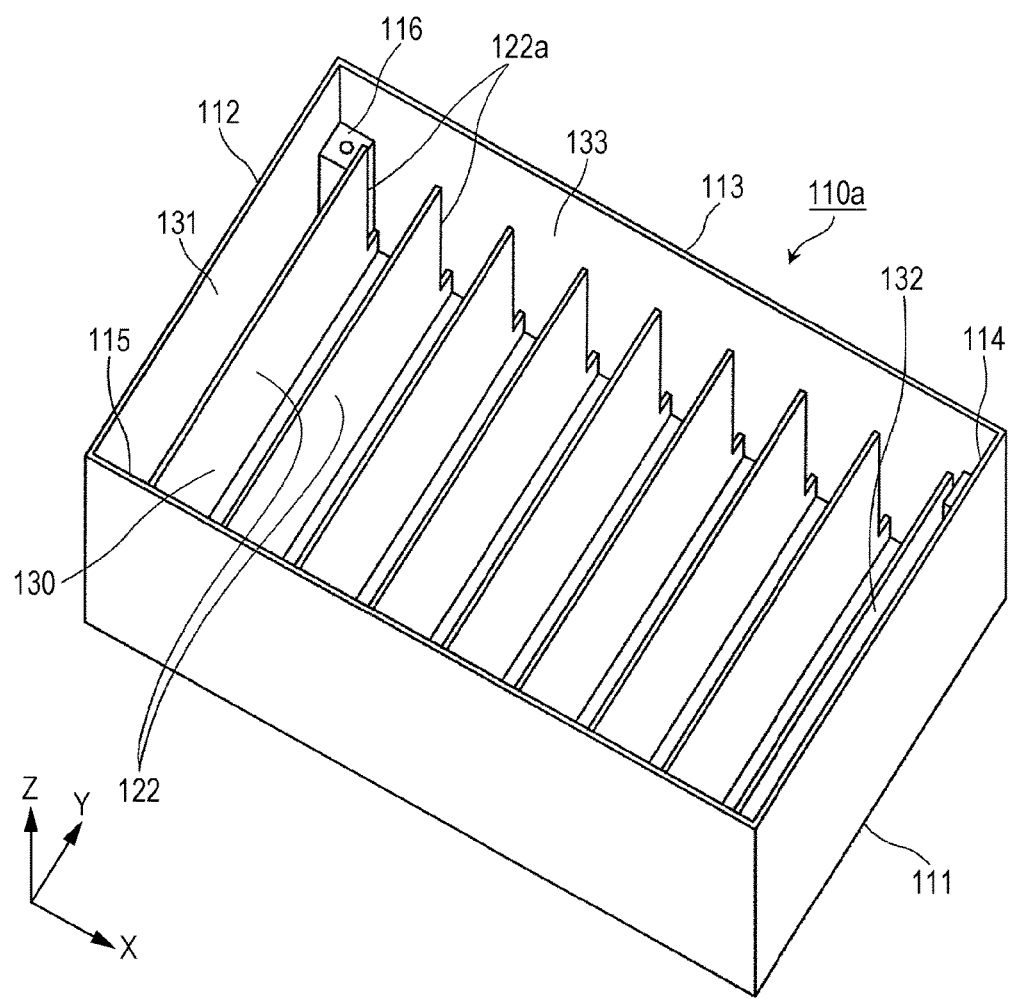
FIG. 12 is a perspective view showing a configuration of a housing and partitioning portions of the outer case body according to the modification 4 of the embodiment of the present invention.

FIG. 10 is a perspective view showing a configuration of an outer case body 100d according to the modification 4 of the embodiment of the present invention. To be more specific, FIG. 10 is a view which corresponds to FIG. 4. FIG. 11 is a perspective view showing a configuration of a high rigidity unit 103 of the outer case body 100d according to the modification 4 of the embodiment of the present invention. To be more specific, FIG. 11 is an exploded perspective view showing a high rigidity unit 103 of the outer case body 100d shown in FIG. 10 in a disassembled state. FIG. 12 is a perspective view showing a configuration of a housing 110a and partitioning portions 122 of the outer case body 100d according to the modification 4 of the embodiment of the present invention. To be more specific, FIG. 12 is a perspective view showing a configuration of the housing 110a and the partitioning portions 122 of the outer case body 100d shown in FIG. 10.

Figure 13A:
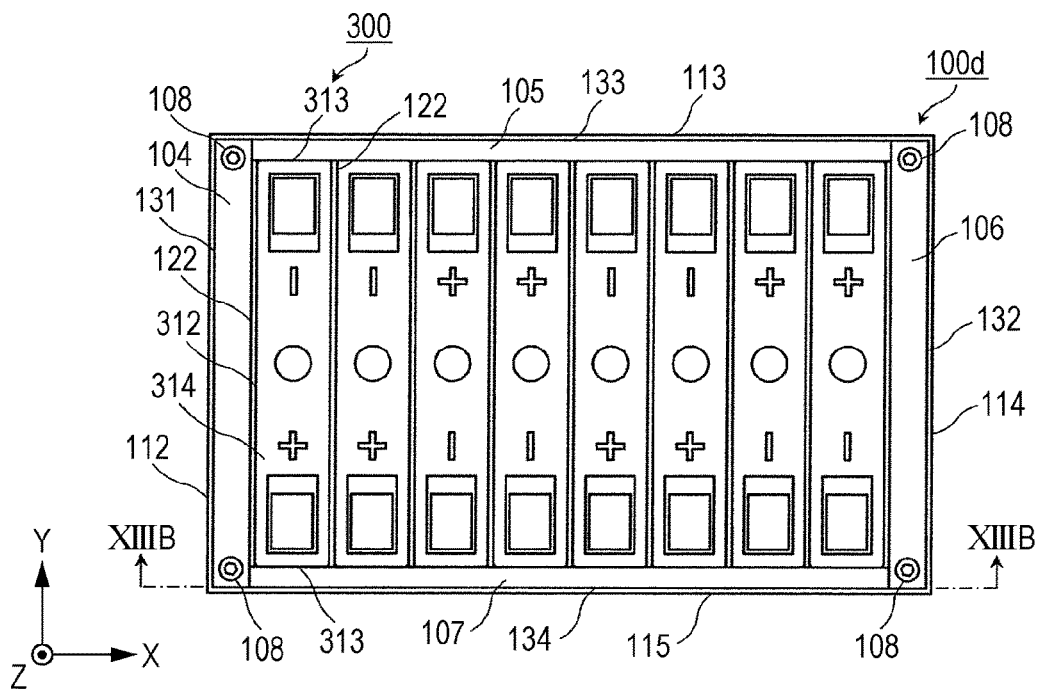
FIG. 13A is a plan view showing a configuration where energy storage devices according to the modification 4 of the embodiment of the present invention are housed in the inside of the outer case body.
Figure 13B:
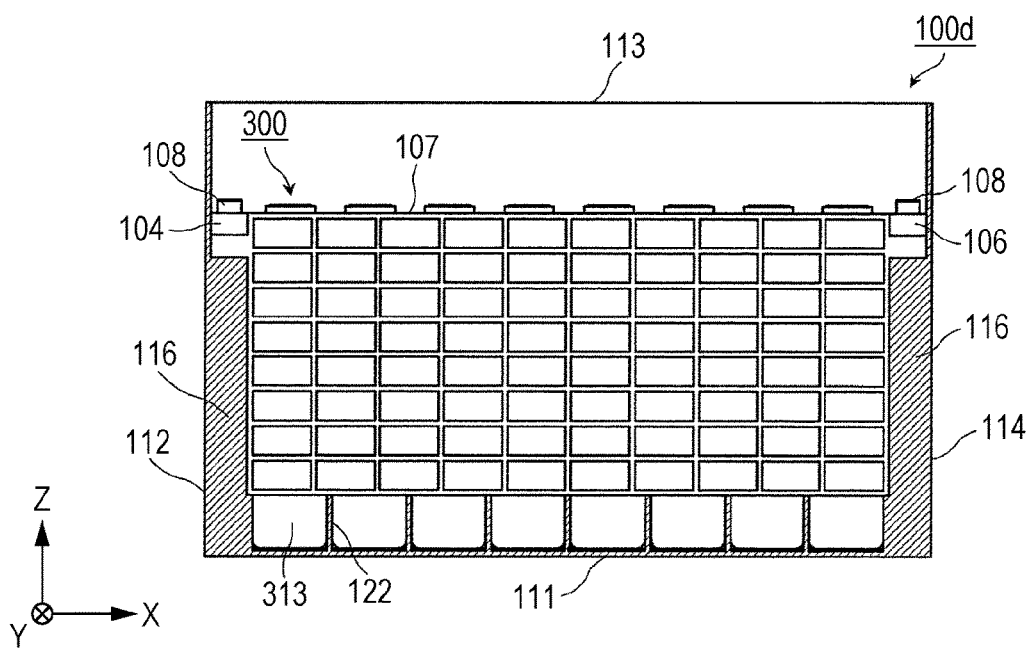
FIG. 13B is a cross-sectional view showing the configuration where the energy storage devices according to the modification 4 of the embodiment of the present invention are housed in the inside of the outer case body.

FIG. 13A is a plan view showing a configuration where energy storage devices 300 according to the modification 4 of the embodiment of the present invention are housed in the inside of the outer case body 100d. To be more specific, FIG. 13A is a view which corresponds to FIG. 5A. FIG. 13B is a cross-sectional view showing the configuration where the energy storage devices 300 according to the modification 4 of the embodiment of the present invention are housed in the inside of the outer case body 100d. To be more specific, FIG. 13B is a cross-sectional view showing the configuration shown in FIG. 13A taken along a line XIIIB-XIIIB.

As shown in these drawings, the outer case body 100d includes the housing 110a, the partitioning portions 122, and the high rigidity unit 103. The high rigidity unit 103 includes high rigidity members 104 to 107, and fastening members 108. The housing 110a includes columnar portions 116 to which the fastening members 108 are fastened in addition to the bottom wall portion 111 and the side wall portions 112 to 115.

The high rigidity members 104 to 107 are rectangular and flat-plate-like conductive members which are mounted on the side wall portions 112 to 115 respectively and are made of metal or the like. That is, the high rigidity members 104 to 107 are disposed individually (separately) which correspond to the respective side wall portions 112 to 115. As a material for forming the high rigidity members 104 to 107, aluminum, stainless steel or the like can be named, for example. However, a material for forming the high rigidity members 104 to 107 is not particularly limited provided that the material has higher rigidity than the wall portions of the outer case body 100d on which the high rigidity members 104 to 107 are mounted.

To be more specific, the high rigidity member 104 is the first member which is disposed between the side wall portion 112 (first wall portion) and the unit formed of the plurality of energy storage devices 300, is mounted on the side wall portion 112 (first wall portion), and has higher rigidity than the side wall portion 112 (first wall portion). The high rigidity member 104 is disposed at substantially the same position as the high rigidity member 101 in the above-mentioned embodiment. The high rigidity member 105 is the second member which is disposed between the side wall portion 113 (second wall portion) and the unit formed of the plurality of energy storage devices 300, is mounted on the side wall portion 113 (second wall portion), and has higher rigidity than the side wall portion 113 (second wall portion). The high rigidity member 106 is the third member which is disposed between the side wall portion 114 (third wall portion) and the unit formed of the plurality of energy storage devices 300, is mounted on the side wall portion 114 (third wall portion), and has higher rigidity than the side wall portion 114 (third wall portion). The high rigidity member 106 is disposed at substantially the same position as the high rigidity member 102 in the above-mentioned embodiment. The high rigidity member 107 is the fourth member which is disposed between the side wall portion 115 (fourth wall portion) and the unit formed of the plurality of energy storage devices 300, is mounted on the side wall portion 115 (fourth wall portion), and has higher rigidity than the side wall portion 115 (fourth wall portion).

In the high rigidity members 104 to 107 (first member to fourth member), the neighboring members are fixed to each other. That is, the high rigidity members 104 to 107 are configured such that the neighboring members are fixed to each other by inserting the fastening members 108 into through holes of the neighboring members and by fastening the fastening member 108 to the columnar portions 116 of the housing 110a. For example, the fastening member 108 is a screw (bolt), and a threaded hole is formed in an upper end portion of the columnar portion 116 extending in the Z axis direction, and the fastening members 108 are fastened to the columnar portions 116 by threaded engagement.

To be more specific, the columnar portions 116 are fixing portions where the side wall portions 112 to 115 and the high rigidity members 104 to 107 are fixed to each other, and are configured such that two columnar portions 116 are positioned on both ends of the side wall portions 112 to 115. Each of the high rigidity members 104 to 107 is disposed between two columnar portions 116, and is fixed to the two columnar portions 116. For example, two columnar portions 116 are positioned at both ends of the side wall portion 112 (first wall portion), and the high rigidity member 104 (first member) is disposed between these two columnar portions 116, and is fixed to these two columnar portions 116. The same goes for the side wall portions 113 to 115 and the high rigidity members 105 to 107.

In this manner, the high rigidity member 104 (first member) and the high rigidity member 105 (second member) are fixed to each other, and the high rigidity member 105 (second member) and the high rigidity member 106 (third member) are fixed to each other. Further, the high rigidity member 104 (first member) and the high rigidity member 107 (fourth member) are fixed to each other, and the high rigidity member 106 (third member) and the high rigidity member 107 (fourth member) are fixed to each other.

With respect to the high rigidity member 104 (first member) and the high rigidity member 105 (second member), a thickness of the high rigidity member 104 (first member) in a thickness direction (X direction) per unit area as viewed in a plan view (plane as viewed from the X direction in FIG. 10) and a thickness of the high rigidity member 105 (second member) in a thickness direction (Y direction) per unit area as viewed in a plan view (plane as viewed from the Y direction in FIG. 10) differ from each other.

To be more specific, as shown in FIG. 10 and FIG. 11, the high rigidity member 104 (first member) is shorter than the high rigidity member 105 (second member) in a width direction (Y direction), and is thicker than the high rigidity member 105 (second member) in a thickness direction (X direction) per unit area as viewed in a plan view.

On the high rigidity members 104 to 107, to enhance the reduction of weight and heat radiation property of the energy storage apparatus 10 or the like, plate-like projecting portions (ribs) which project in a direction toward the respective side wall portions 112 to 115 from the energy storage devices 300 are formed in a grid array. That is, in the respective high rigidity members 104 to 107, the projecting portions are formed of a plurality of plate-like (strip-like) projecting portions which extend parallel to each other in the longitudinal direction as well as in the lateral direction. Among the plurality of projecting portions which extend parallel to each other, a distance between the neighboring projecting portions is not particularly limited. However, for example, all projecting portions are arranged at substantially equal intervals or the projecting portions are arranged such that the distance between the projecting portions in the lateral direction is set narrower than the distance between the projecting portions in the longitudinal direction. Further, for example, to enhance a strength of a center portion and corner portions of the high rigidity members 104 and 106, the projecting portions may be formed such that the distance between the projecting portions at the center portion and at the corner portions of the high rigidity members is set narrower than the distance between the projecting portions at other portions.

The partitioning portion 122 has recessed portions 122a formed by cutting out portions of the partitioning portion 122 which extend along the side wall portions 113, 115 so as to enable the arrangement of the high rigidity members 105, 107 in conformity with the side wall portions 113, 115. That is, the partitioning portion 122 has the recessed portions 122a at both end portions thereof in the Y axis direction. Due to the recessed portions 122a, high rigidity member housing portions 133, 134 in which the high rigidity members 105, 107 are respectively housed are formed. In the same manner as the above-mentioned embodiment, due to the partitioning portions 122, the high rigidity member housing portions 131, 132 in which the high rigidity members 104, 106 are housed respectively are formed. With such a configuration, the high rigidity members 104 to 107 are disposed by being inserted into the high rigidity member housing portions 131, 133, 132 and 134 respectively.

The partitioning portions 122 may be formed integrally with the housing 110a, or may be formed as separate bodies from the housing 110a. The outer case body 100d may not have the fastening members 108 and the columnar portions 116, and the high rigidity members 104 to 107 may be inserted into the high rigidity member housing portions 131, 133, 132 and 134 respectively without being fixed to the side wall portions 112 to 115 respectively.

The configurations which the outer case body 100d has including the bottom wall portion 111 and the side wall portions 112 to 115 of the housing 110a and other parts are substantially equal to the corresponding configurations of the outer case body 100 according to the above-mentioned embodiment and hence, the detailed description of such configurations is omitted. Further, the configurations other than the outer case body 100d are also substantially equal to the corresponding configurations of the energy storage apparatus 10 according to the above-mentioned embodiment and hence, the detailed description of such configurations is omitted.

As has been described heretofore, in the energy storage apparatus 10 according to the modification 4 of the embodiment of the present invention, the outer case 11 has the second member also between the second wall portion disposed adjacently to the first wall portion and the energy storage device 300. The second member has the higher rigidity than the second wall portion and is mounted on the second wall portion. With such a configuration, rigidity of two wall portions disposed adjacently to the outer case 11 can be further increased by the second member and hence, it is possible to protect the energy storage devices 300 from an external force from two wall portion sides disposed adjacently to each other.

By fixing the first member and the second member to each other, the relative movement between the first member and the second member in the inside of the outer case 11 can be restricted.

The thickness of the first member in the thickness direction per unit area as viewed in a plan view is larger than the thickness of the second member in the thickness direction per unit area as viewed in a plan view and hence, the rigidity of the first member positioned at an end portion in the arrangement direction (X direction) of the energy storage devices 300 is increased. With such a configuration, it is possible to prevent the expansion of the energy storage devices 300 in the X direction.

The outer case 11 has the columnar portions 116 as the fixing portions for fixing the first wall portion and the first member to each other on the end portions of the first wall portion and hence, the first member can be firmly fixed to the first wall portion. Further, by disposing the fixing portions at the end portions of the first wall portion, space saving can be realized.

The first member is fixed by being sandwiched between two columnar portions 116 formed on both ends of the first wall portion and hence, the first member can be fixed to the first wall portion more firmly.

(Modification 5)

Next, the modification 5 of the above-mentioned embodiment is described. In the above-mentioned embodiment and the modification 4, the partitioning portions extend to the upper portion of the energy storage device 300. However, in this modification, the partitioning portions extend only to a lower portion of the energy storage device 300.

Figure 14:
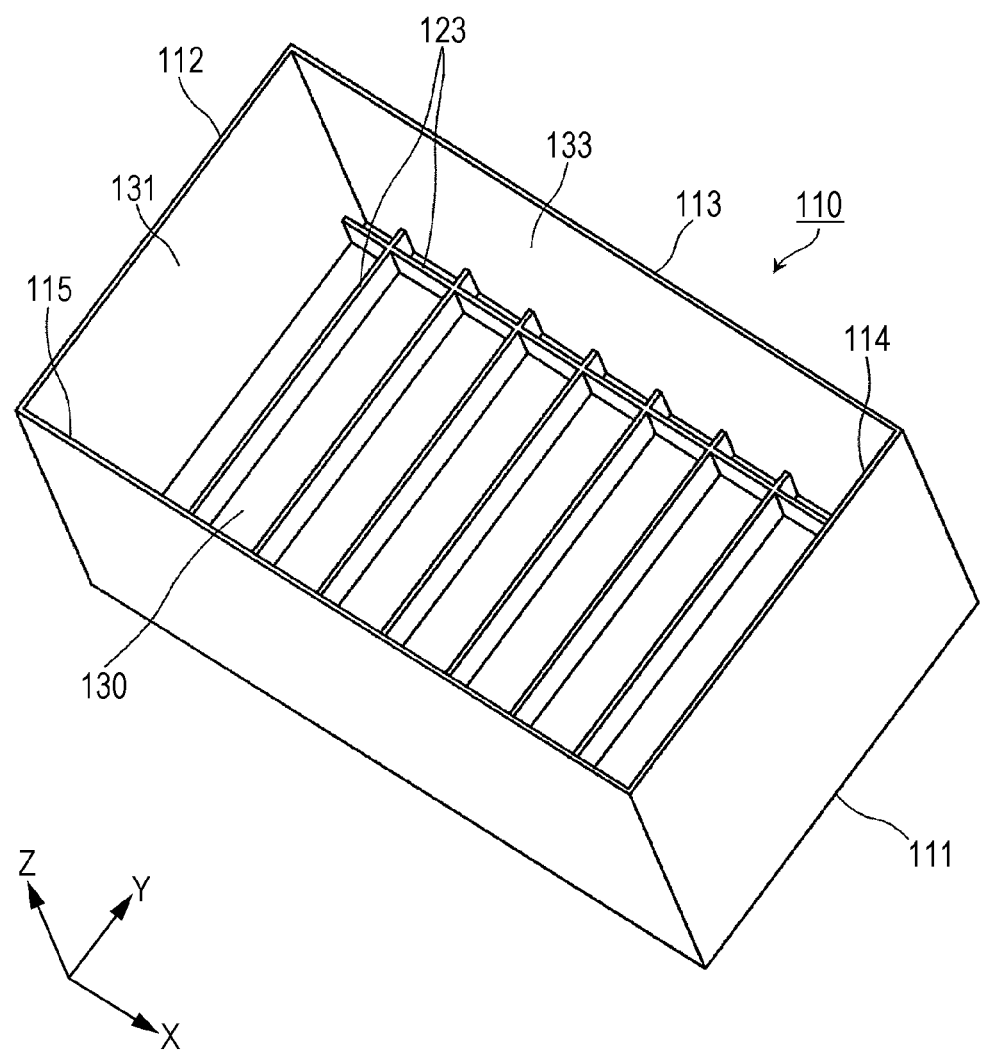
FIG. 14 is a perspective view showing a configuration of a partitioning portion according to a modification 5 of the embodiment of the present invention.

FIG. 14 is a perspective view showing a configuration of the partitioning portions 123 according to the modification 5 of the embodiment of the present invention. To be more specific, FIG. 14 shows the configuration of the housing 110 and the partitioning portions 123 in a state where high rigidity members are removed from an outer case body.

As shown in FIG. 14, the partitioning portions 123 are plate-like (strip-like) projecting portions which extend in the X axis direction as well as in the Y axis direction to a height which allows the formation of the energy storage device housing portions 130, the high rigidity member housing portion 131 and the like. That is, the energy storage devices 300 are housed in the energy storage device housing portions 130 partitioned by the partitioning portions 123, and the high rigidity member 101 (or high rigidity member 104) is housed in the high rigidity member housing portion 131. The same goes for the high rigidity member 102 (or high rigidity member 106). Further, when the high rigidity members 105, 107 are disposed as in the case of the modification 4, the high rigidity members 105, 107 are housed in the high rigidity member housing portion 133 and the like in the housing 110 in a state where the high rigidity members 105, 107 are placed on the partitioning portions 123.

The partitioning portions 123 may be formed integrally with the housing 110 or may be formed as separate bodies from the housing 110. To ensure insulation between the high rigidity member and the energy storage device 300 and between neighboring energy storage devices 300, the high rigidity member and the energy storage devices 300 may be covered by an insulating member (insulating paint, insulating film or the like). Alternatively, an insulating member (partitioning plate) may be disposed between the high rigidity member and the energy storage device 300 and between neighboring energy storage devices 300. The housing 110 and other configurations of the modification 5 are substantially equal to the corresponding configurations of the energy storage apparatus 10 according to the above-mentioned embodiment or the modification 4 and hence, the detailed description of such configurations is omitted.

As has been described heretofore, the energy storage apparatus 10 according to the modification 5 of the embodiment of the present invention can obtain substantially the same advantageous effect as the above-mentioned embodiment and the modification 4. Particularly, in this modification, the partitioning portions 123 are formed with a small height and hence, an amount of material used for forming the outer case body can be reduced.

(Modification 6)

Next, a modification 6 of the above-mentioned embodiment is described. In the above-mentioned embodiment and the modification 4, the high rigidity member is mounted on the short-side-surface-side wall portion of the outer case 11. However, in this modification, the high rigidity member is not mounted on the short-side-surface-side wall portion of the outer case 11.

Figure 15:
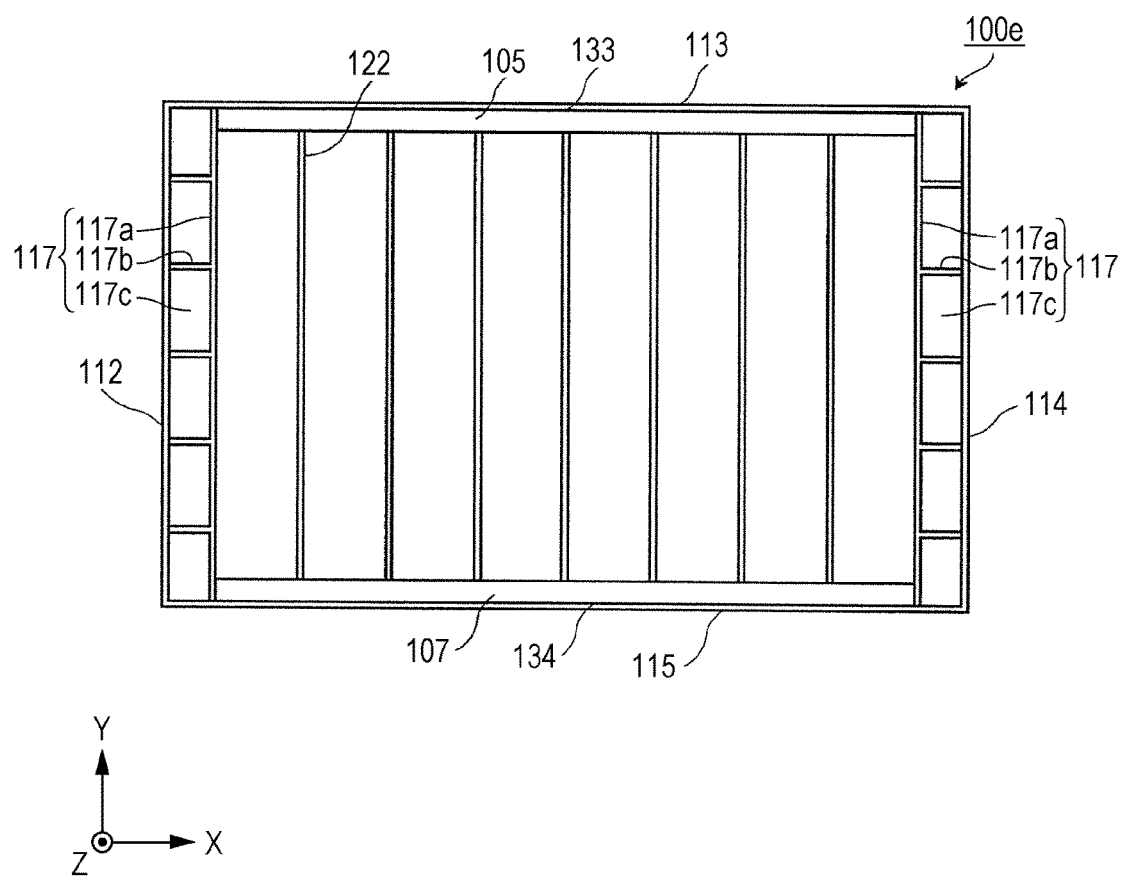
FIG. 15 is a plan view showing a configuration of an outer case body according to a modification 6 of the embodiment of the present invention.

FIG. 15 is a plan view showing a configuration of an outer case body 100e according to the modification 6 of the embodiment of the present invention. To be more specific, FIG. 15 is a view which corresponds to the outer case body 100d shown in FIG. 13A.

As shown in FIG. 15, the outer case body 100e includes space forming wall portions 117 in place of the high rigidity members 104, 106 in the outer case body 100d of the above-mentioned modification 4. The space forming wall portion 117 is a portion disposed between the side wall portion 112 and the energy storage device 300 and forms a plurality of spaces between the space forming wall portion 117 and the side wall portion 112. Although the space forming wall portion 117 is also disposed on the side wall portion 114 side in the same manner, the configuration of the space forming wall portion 117 on the side wall portion 114 side is substantially equal to the configuration of the space forming wall portion 117 on the side wall portion 112 side and hence, the detailed description of the configuration of the space forming wall portion 117 on the side wall portion 114 side is omitted. The same goes for the following configuration.

To be more specific, the space forming wall portion 117 includes a flat-plate-like portion 117a and strip-like portions 117b, and the plurality of spaces 117c are formed by the flat-plate-like portion 117a and the strip-like portions 117b. The flat-plate-like portion 117a is a rectangular flat-plate-like portion which is disposed in an extending manner between two side wall portions 113, 115, is connected to the bottom wall portion 111 and two side wall portions 113, 115, and is disposed parallel to a YZ plane. The strip-like portions 117b are strip-like portions which are connected to the flat-plate-like portion 117a and the side wall portion 112, partition the space defined between the flat-plate-like portion 117a and the side wall portion 112, and are disposed in an extending manner in the Z axis direction. With such a configuration, the plurality of spaces 117c which are separated from each other are formed by partitioning using the flat-plate-like portion 117a and the strip-like portions 117b.

Although shapes of the flat-plate-like portion 117a and the strip-like portion 117b, the number of strip-like portions 117b and the like are not particularly limited, in this embodiment, the flat-plate-like portion 117a is formed so as to have the larger thickness than the partitioning portion 122. The strip-like portions 117b are formed so as to have the smaller thickness than the partitioning portion 122. Further, the space forming wall portion 117 may be formed integrally with the side wall portion 112 and may be formed as a separate body from the side wall portion 113. Further, configurations other than the above-mentioned configurations are substantially equal to the corresponding configurations of the energy storage apparatus 10 according to the above-mentioned embodiment or the modification 4 and hence, the detailed description of such configurations is omitted.

In this modification, the side wall portion 113 which is a wall portion disposed on a long side surface of the outer case 11 is assumed as the first wall portion, and the side wall portion 112 which is a wall portion disposed on a short side surface of the outer case 11 is assumed as the second wall portion. That is, also in this modification, the high rigidity member 105 is disposed between the side wall portion 113 (first wall portion) and the unit formed of the plurality of energy storage devices 300, and is mounted on the side wall portion 113 (first wall portion).

As has been described heretofore, the energy storage apparatus 10 according to the modification 6 of the embodiment of the present invention can obtain substantially the same advantageous effect as the above-mentioned embodiment and the modification 4. Particularly, in this modification, by enhancing rigidity of the long-side-surface-side first wall portion of the outer case 11 and by forming the plurality of spaces 117c between the second wall portion on a short-side-surface side and the energy storage device 300, it is possible to protect the energy storage devices 300 from an external force from the first wall portion side and the second wall portion side. Further, the strip-like portions 117b are formed with a small thickness and hence, it is possible to make the strip-like portions 117b easily collapse by an impact from the outside and easily absorb the impact.

Due to the spaces 117c disposed on the second wall portion side of the outer case 11, expansion and shrinkage of the energy storage devices 300 can be absorbed. Particularly, the flat-plate-like portion 117a is formed with a large thickness and the strip-like portions 117b are disposed and hence, expansion and shrinkage of the energy storage devices 300 can be easily absorbed.

It is often the case that a dead space is formed between the second wall portion and the long side surface of the energy storage device 300 depending on the number of energy storage devices 300 to be disposed. By forming the spaces 117c on the long side surface side (second wall portion side) of the energy storage device 300, the dead space can be effectively utilized.

By forming the space forming wall portion 117 integrally with the side wall portion 112, the number of parts can be reduced, and parts can be easily assembled at the time of manufacturing the energy storage apparatus 10.

(Modification 7)

Next, a modification 7 of the above-mentioned embodiment is described. In the above-mentioned modification 6, the high rigidity members 105, 107 are mounted on the long-side-surface-side wall portions of the outer case 11. However, in this modification, a plurality of projecting portions are formed on long-side-surface-side wall portions of an outer case 11.

Figure 16:
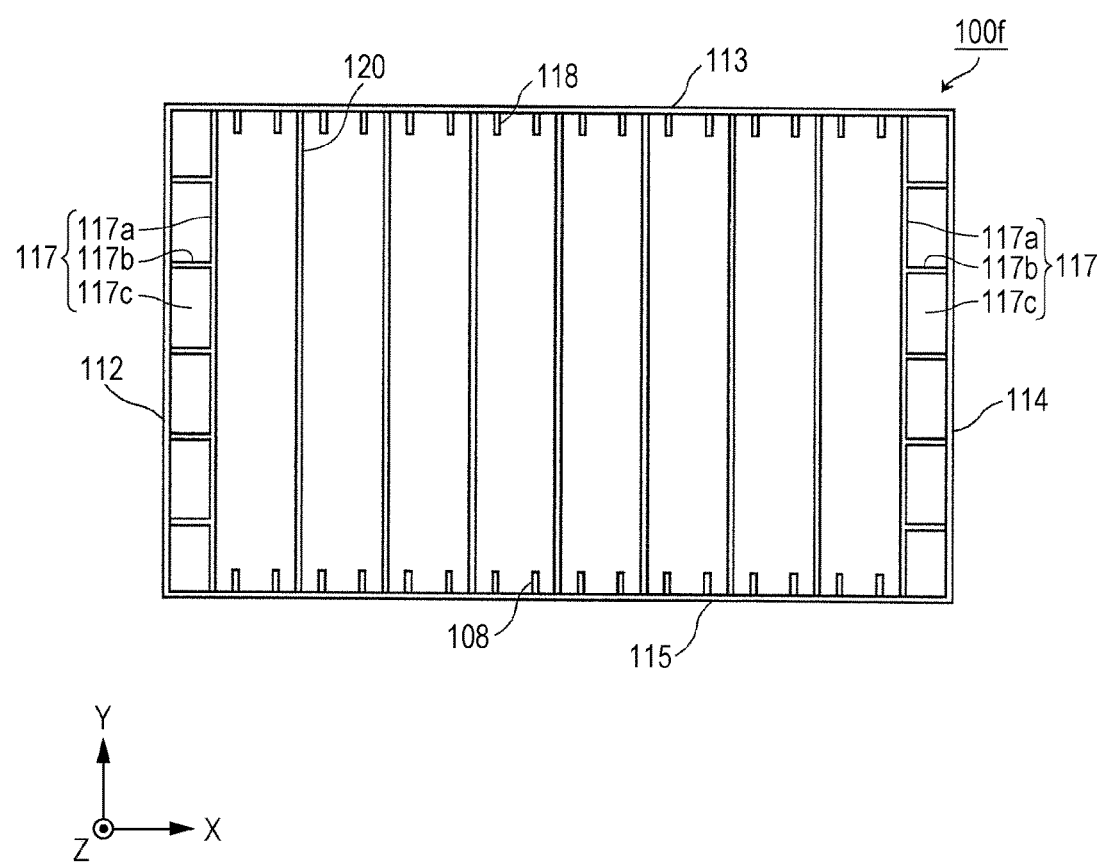
FIG. 16 is a plan view showing a configuration of an outer case body according to a modification 7 of the embodiment of the present invention.

FIG. 16 is a plan view showing a configuration of an outer case body 100f according to the modification 7 of the embodiment of the present invention. To be more specific, FIG. 16 is a view which corresponds to the outer case body 100e shown in FIG. 15.

As shown in FIG. 16, the outer case body 100f includes a plurality of projecting portions 118 in place of the high rigidity members 105, 107 in the outer case body 100e in the above-mentioned modification 6. That is, also in this modification, in the same manner as the modification 6, the outer case body 100f includes space forming wall portions 117 each of which is disposed between the side wall portions 112, 114 and the energy storage device 300, and forms a plurality of spaces 117c between the energy storage device 300 and the side wall portion 112, 114.

The projecting portions 118 are ribs which are disposed between the side wall portion 113 and the energy storage devices 300, and project toward the energy storage devices 300 from the side wall portion 113. To be more specific, the projecting portions 118 are plate-like (strip-like) portions which are formed in an extending manner in the Z axis direction along an inner surface of the side wall portion 113. The projecting portions 118 may be formed integrally with the side wall portion 113, or may be formed as a separate body from the side wall portion 113. The same goes for the side wall portion 115 side.

Partitioning portions 120 in this modification have substantially the same configuration as the partitioning portions 120 in the above-mentioned embodiment. Further, configurations other than the above-mentioned configurations are substantially equal to the corresponding configurations of the energy storage apparatus 10 according to the above-mentioned embodiment or the modification 4 or 6 and hence, the detailed description of such configurations is omitted.

In this modification, in the same manner as the above-mentioned embodiment, the side wall portion 112 which is a wall portion disposed in an opposedly facing manner with a long side surface of the energy storage device 300 is assumed as the first wall portion, and the side wall portion 113 which is a wall portion disposed in an opposedly facing manner with the short side surface of the energy storage device 300 is assumed as the second wall portion.

As has been described heretofore, the energy storage apparatus 10 according to the modification 7 of the embodiment of the present invention can obtain substantially the same advantageous effect as the above-mentioned embodiment and the modification 6. Particularly, in this modification, the outer case 11 is configured such that the plurality of spaces 117c are formed between the first wall portion and the energy storage device 300, and the plurality of projecting portions 18 are formed between the second wall portion and the energy storage devices 300. With such a configuration, it is possible to protect the energy storage devices 300 from an external force from the first wall portion side and the second wall portion side by the plurality of spaces 117c disposed on the first wall portion side and the plurality of projecting portions 118 disposed on the second wall portion side.

Further, expansion and shrinkage of the energy storage devices 300 can be absorbed by the spaces 117c disposed on the first wall portion side of the outer case 11. It is often the case that a dead space is formed between the first wall portion and the long side surface of the energy storage device 300 depending on the number of energy storage devices 300 to be disposed. By forming the spaces 117c on the long side surface side (first wall portion side) of the energy storage device 300, the dead space can be effectively utilized.

On the second wall portion side, a dead space is minimally formed and hence, the projecting portions 118 are only formed on the second wall portion side. Accordingly, a distance between the second wall portion and the short side surface of the energy storage device 300 can be made small thus realizing the miniaturization of the energy storage apparatus 10.

Although the energy storage apparatuses 10 according to the embodiment of the present invention and modifications of the embodiment have been described, the present invention is not limited to the above-mentioned embodiment and modifications of the embodiment. That is, it should be construed that the embodiment and the modifications of the embodiment disclosed in this specification are only for an exemplifying purpose in all aspects and are not limited. The scope of the present invention is not designated by the above-mentioned description but is designated by Claims, and it is intended that all modifications which fall within the meaning and the scope equivalent to Claims are also included in the scope of the present invention.

For example, in the above-mentioned embodiment and the modifications of the embodiment, the housing, the partitioning portions, and the lid body of the outer case (that is, portions other than the high rigidity members) are made of an insulating material such as a resin, and the high rigidity members are made of a conductive material such as metal. However, materials for forming these constitutional elements are not particularly limited. That is, for example, the high rigidity members may be made of an insulating material such as a resin provided that the high rigidity members are made of a material having higher rigidity than the wall portions on which the high rigidity members are mounted. Further, portions of the outer case other than the high rigidity members may be made of a conductive material such as metal, and the high rigidity members may be made of a conductive material such as a metal or an insulating material such as a resin having higher rigidity than the wall portions on which the high rigidity members are mounted.

In the above-mentioned embodiment and the modifications of the embodiment, the first member is directly mounted on the first wall portion of the outer case. However, the first member may be indirectly mounted on the first wall portion by being fixed to other portion of the outer case such as the second wall portion disposed adjacently to the first wall portion by threaded engagement. The same goes for the second member to the fourth member.

In the above-mentioned embodiment and the modifications of the embodiment, the energy storage apparatus 10 includes the plurality of energy storage devices 300. However, the energy storage apparatus 10 may be configured to include only one energy storage device 300.

Further, the configurations which are made by arbitrarily combining constitutional elements which the above-mentioned embodiment and the modifications of the embodiment include are also included in the scope of the present invention. For example, by applying the configuration of the modification 4 to the modifications 2, 3 and the like, the high rigidity members 104 to 107 may be adhered to wall surfaces of the outer case, or may be formed by insert molding.

The present invention is applicable to an energy storage apparatus or the like including an energy storage device such as a lithium ion secondary battery and the like.

What is claimed is:

1. An energy storage apparatus comprising:
    an energy storage device; and
    an outer case,
    wherein the outer case includes:
        a first wall portion disposed in an opposedly facing manner with a side surface of the energy storage device; and
        a first member having higher rigidity than the first wall portion, the first member being disposed between the first wall portion and the energy storage device and mounted on the first wall portion, and being in direct contact with the first wall portion,
    wherein the energy storage device includes a housing in which an electrode assembly is disposed, the housing including a lid portion, a bottom wall portion opposing to the lid portion, and a plurality of side wall portions connecting the lid portion and the bottom wall portion, and
    wherein the plurality of side wall portions includes a short wall portion and a long wall portion.

2. The energy storage apparatus according to claim 1, wherein the first member has insulating property.

3. An energy storage apparatus comprising:
    an energy storage device; and
    an outer case,
    wherein the outer case includes:
        a resin-made first wall portion disposed in an opposedly facing manner with a long-side surface of the energy storage device; and
        a metal first member disposed between the first wall portion and the energy storage device and mounted on the first wall portion,
    wherein the energy storage device includes a housing in which an electrode assembly is disposed, the housing including a lid wall portion, a bottom wall portion opposing to the lid portion, a plurality of side wall portions connecting the lid wall portion and the bottom wall portion,
    wherein the plurality of side wall portions includes a short wall portion and a long wall portion, and wherein the metal first member is larger than the long wall portion in a longitudinal direction of the long wall portion.

4. The energy storage apparatus according to claim 1, wherein the outer case includes a fixing portion inside the outer case for fixing the first wall portion and the first member to each other, and
the fixing portion is positioned on an end portion of the first wall portion.

5. The energy storage apparatus according to claim 4, wherein the fixing portion is formed of two columnar portions formed on both ends of the first wall portion, and
the first member is disposed between the two columnar portions and is fixed to the two columnar portions.

6. The energy storage apparatus according to claim 1, wherein the outer case further includes:
a second wall portion disposed at a position adjacently to the first wall portion; and
a second member having higher rigidity than the second wall portion, the second member being disposed between the second wall portion and the energy storage device and mounted on the second wall portion.

7. The energy storage apparatus according to claim 6, wherein the first member and the second member are fixed to each other.

8. The energy storage apparatus according to claims 6, wherein a thickness of the first member per unit area as viewed in a plan view and a thickness of the second member per unit area as viewed in a plan view differ from each other.

9. The energy storage apparatus according to claim 1, wherein the first wall portion is a wall portion disposed on a long-side surface of the outer case, and
the outer case further includes:
a second wall portion disposed on a short-side surface of the outer case, and
a space forming wall portion disposed between the second wall portion and the energy storage device and forming a plurality of spaces between the space forming wall portion and the second wall portion.

10. The energy storage apparatus according to claim 1, wherein the outer case further includes a partitioning portion disposed between the first member and the energy storage device, and
the first member is inserted between the first wall portion and the partitioning portion.

11. An energy storage apparatus comprising:
an energy storage device; and
an outer case,
wherein the outer case includes:
a first wall portion disposed in an opposedly facing manner with a long-side surface of the energy storage device;
a second wall portion disposed in an opposedly facing manner with a short-side surface of the energy storage device;
a space forming wall portion disposed between the first wall portion and the energy storage device, the space forming wall portion forming a plurality of spaces between the space forming wall portion and the first wall portion, and
a plurality of projecting portions disposed between the second wall portion and the energy storage device, the projecting portions projecting toward the energy storage device from an inner surface of the second wall portion.

12. A method of manufacturing an energy storage apparatus which includes an energy storage device and an outer case, the method comprising:
disposing the energy storage device in the outer case; and
disposing a first member having rigidity higher than a first wall portion of the outer case at a position sandwiched by the first wall portion of the outer case and the energy storage device before or after the energy storage device disposing step,
wherein the first member is in direct contact with the first wall portion,
wherein the energy storage device includes a housing in which an electrode assembly is disposed, the housing including a lid wall portion, a bottom wall portion opposing to the lid portion, and a plurality of side wall portions connecting the lid wall portion and the bottom wall portion, and
wherein the plurality of side wall portions includes a short wall portion and a long wall portion.

13. The energy storage apparatus according to claim 1, wherein the outer case comprises:
a partitioning portion formed between the first member and the side surface of the energy storage device.

14. The energy storage apparatus according to claim 13, wherein the outer case comprises:
a housing portion for housing the first member, formed between the partitioning portion and the first wall portion.

15. The energy storage apparatus according to claim 14, wherein the outer case comprises:
a bottom wall portion, the housing portion comprising a rectangular parallelepiped space formed on the bottom wall portion.

16. The energy storage apparatus according to claim 14, wherein a shape of the first member is substantially the same as a shape of the housing portion.

17. The energy storage apparatus according to claim 1, wherein the first member comprises a plate-shaped member.

18. The energy storage apparatus according to claim 1, wherein the first member extends from the bottom wall portion to the lid portion and covers an entirety of the side surface of the energy storage device.

19. The energy storage apparatus according to claim 6, wherein the energy storage device comprises a plurality of energy storage devices which are stacked in a stacking direction, and the first and second members are formed on opposing sides of the plurality of energy storage devices in the stacking direction.

* * * * *